(12) United States Patent
Pollack

(10) Patent No.: US 11,005,922 B1
(45) Date of Patent: May 11, 2021

(54) METHOD AND SYSTEM FOR GENERATING REDUCED ADDRESS DATASET AND METHOD AND SYSTEM FOR USING SAID DATASET

(71) Applicant: DATTO, INC., Norwalk, CT (US)

(72) Inventor: Edward Herman Pollack, Albany, NY (US)

(73) Assignee: DATTO, INC., Norwalk, CT (US)

( * ) Notice: Subject to any disclaimer, the term of this patent is extended or adjusted under 35 U.S.C. 154(b) by 0 days.

(21) Appl. No.: 17/020,599

(22) Filed: Sep. 14, 2020

Related U.S. Application Data

(60) Provisional application No. 63/038,497, filed on Jun. 12, 2020.

(51) Int. Cl.
| | |
|---|---|
| *H04L 12/24* | (2006.01) |
| *H04L 29/12* | (2006.01) |
| *H04L 12/855* | (2013.01) |
| *H04L 29/08* | (2006.01) |
| *H04L 29/06* | (2006.01) |
| *G06F 15/16* | (2006.01) |
| *G06F 15/173* | (2006.01) |
| *G06F 11/30* | (2006.01) |

(52) U.S. Cl.
CPC ...... *H04L 67/1008* (2013.01); *H04L 61/2069* (2013.01); *H04L 67/42* (2013.01)

(58) Field of Classification Search
USPC ................................ 709/226, 224, 203, 217
See application file for complete search history.

(56) References Cited

U.S. PATENT DOCUMENTS

| | | | | |
|---|---|---|---|---|
| 10,825,093 | B2* | 11/2020 | Vicari | G06Q 40/06 |
| 2003/0149741 | A1* | 8/2003 | Krooss | H04L 67/40 |
| | | | | 709/217 |
| 2004/0054925 | A1* | 3/2004 | Etheridge | H04L 63/1458 |
| | | | | 726/22 |
| 2012/0250870 | A1* | 10/2012 | Matthias | H04R 27/00 |
| | | | | 381/58 |
| 2015/0120002 | A1* | 4/2015 | Kim | G05B 19/414 |
| | | | | 700/19 |
| 2016/0087847 | A1* | 3/2016 | Krithivas | H04L 41/044 |
| | | | | 709/224 |
| 2019/0156596 | A1* | 5/2019 | Followell | G07C 5/085 |
| 2019/0260204 | A1* | 8/2019 | Koval | G06N 3/126 |

* cited by examiner

*Primary Examiner* — Jude Jean Gilles
(74) *Attorney, Agent, or Firm* — Fay Sharpe LLP

(57) ABSTRACT

A method of generating a reduced address dataset for a geographical area includes receiving a source address dataset for a select geographical area, removing personally identifiable address parameters from detailed address parameters of a plurality of source address datapoints to form a reduced address dataset with a plurality of anonymous address datapoints, and storing the first version of the reduced address dataset. The reduced address dataset is for use by a geographical analytics service provider as a reference address dataset in analyzing target parameters in a target dataset associated with one or more managed service providers to develop geographical distributions of the target parameters. A method of generating a geographical distribution of a target parameter of a target dataset by using the reduced address dataset is also provided. Analytics computer system for generating the reduced dataset and for using the reduced address dataset are also provided.

22 Claims, 25 Drawing Sheets

METHOD AND SYSTEM FOR GENERATING REDUCED ADDRESS DATASET AND METHOD AND SYSTEM FOR USING SAID DATASET

CROSS-REFERENCE TO RELATED APPLICATION

This application claims priority to and the benefit of U.S. Provisional Patent Application Ser. No. 63/038,497, filed Jun. 12, 2020 and entitled METHOD AND SYSTEM FOR GENERATING REDUCED ADDRESS DATASET AND METHOD AND SYSTEM FOR USING SAID DATASET, the contents of which are fully incorporated herein by reference.

BACKGROUND

The present exemplary embodiment relates to generating a reduced address dataset based on a source address dataset. It finds particular application in conjunction with using the reduced address dataset as a reference address dataset in generating a geographical distribution of a target parameter of a target dataset conditioned to be compatible with the reference address dataset, and will be described with particular reference thereto. However, it is to be appreciated that the present exemplary embodiment is also amenable to other like applications.

BRIEF DESCRIPTION

In one aspect, a method of generating a reduced address dataset for a geographical area is provided. In one embodiment, the method includes receiving a source address dataset for a select geographical area at one or more reduced data servers of an analytics computer system from at least one source data server of a source computer system via a data communication network, wherein the source address dataset includes a plurality of source address datapoints, wherein each source address datapoint is represented by detailed address parameters and corresponding geographical location parameters, wherein the detailed address parameters include personally identifiable address parameters and anonymous address parameters; removing the personally identifiable address parameters from the detailed address parameters of the plurality of source address datapoints at the analytics computer system to form a first version of a reduced address dataset with a plurality of anonymous address datapoints, wherein each anonymous address datapoint is represented by the anonymous address parameters and the geographical location parameters; and storing the first version of the reduced address dataset in the one or more reduced data servers; wherein the reduced address dataset is for use by a geographical analytics service provider as a reference address dataset in analyzing target parameters in a target dataset associated with one or more managed service providers to develop geographical distributions of the target parameters.

In another aspect, an analytics computer system for generating a reduced dataset for a geographical area is provided. In one embodiment, the analytics computer system includes a network interface device, at least one processor and associated memory, at least one application storage device, and one or more reduced data servers. The network interface device is configured to receive a source address dataset for a select geographical area from at least one source data server of a source computer system via a data communication network. The source address dataset includes a plurality of source address datapoints. Each source address datapoint is represented by detailed address parameters and corresponding geographical location parameters. The detailed address parameters include personally identifiable address parameters and anonymous address parameters. The at least one application storage device is configured to store an address dataset management program. The at least one processor and associated memory, in conjunction with execution of the address dataset management program, are configured to remove the personally identifiable address parameters from the detailed address parameters of the plurality of source address datapoints to form a first version of the reduced address dataset with a plurality of anonymous address datapoints. Each anonymous address datapoint is represented by the anonymous address parameters and the geographical location parameters. The at least one processor and associated memory, in conjunction with execution of the address dataset management program, are configured to store the first version of the reduced address dataset in the one or more reduced data servers. The analytics computer system and the reduced address dataset are for use by a geographical analytics service provider as a reference address dataset in analyzing target parameters in a target dataset associated with one or more managed service providers to develop geographical distributions of the target parameters.

In yet another aspect, a method of generating a geographical distribution of a target parameter of a target dataset is provided. In one embodiment, the method includes: accessing a target dataset for a select geographical area stored in at least one target data server using an analytics computer system via a data communication network, wherein the target dataset includes a plurality of target datapoints, wherein each target datapoint is represented by at least one target parameter and corresponding reported address parameters, wherein the reported address parameters include personally identifiable address parameters and non-personally identifiable address parameters; accessing a reference address dataset stored in one or more reference data servers using the analytics computer system, wherein the reference address dataset includes a plurality of reference address datapoints, wherein each reference address datapoint is represented by anonymous address parameters, at least one group identifier parameter, and geographical location metric parameters associated with each group identifier parameter, wherein each group identifier parameter is associated with a different division of the plurality of reference address datapoints into a plurality of groups by matching values of a select combination of one or more anonymous address parameters from the plurality of anonymous address parameters; conditioning the target dataset for compatibility with the reference address dataset and for compliance with requirements associated with generating geographical distributions of target parameters of the target dataset, wherein the conditioning is performed at the analytics computer system to form a first version of a conditioned target dataset with a plurality of conditioned target datapoints, wherein each conditioned target datapoint is represented by at least the at least one target parameter and the non-personally identifiable address parameters; and comparing the non-personally identifiable address parameters of each conditioned target datapoint of the first version of the conditioned target dataset to the anonymous address parameters of the reference address datapoints of the reference address dataset at the analytics computer system to determine at least one reference address datapoint with the most matches of non-personally identifiable address parameters to anonymous address parameters for the corresponding conditioned target datapoint or to determine the corresponding conditioned target datapoint does not match any of the plurality of reference address datapoints; wherein the conditioned target dataset is for use by a geographical analytics service provider in analyzing the at least one target parameter which is associated with one or more managed service providers to develop geographical distributions of the at least one target parameter.

In still another aspect, an analytics computer system for generating a geographical distribution of a target parameter of a target dataset is provided. In one embodiment, the analytics computer system includes at least one network interface device, at least one processor and associated memory, at least one application storage device, and one or more reference data servers. The at least one network interface device is configured to access a target dataset for a select geographical area stored in at least one target data server using an analytics computer system via a data communication network. The target dataset includes a plurality of target datapoints, Each target datapoint is represented by at least one target parameter and corresponding reported address parameters. The reported address parameters include personally identifiable address parameters and non-personally identifiable address parameters. The at least one application storage device is configured to store a target dataset analytical program. The at least one processor and associated memory, in conjunction with execution of the target dataset analytical program, are configured to access a reference address dataset stored in the one or more reference data servers. The reference address dataset includes a plurality of reference address datapoints, Each reference address datapoint is represented by anonymous address parameters, at least one group identifier parameter, and geographical location metric parameters associated with each group identifier parameter. Each group identifier parameter is associated with a different division of the plurality of reference address datapoints into a plurality of groups by matching values of a select combination of one or more anonymous address parameters from the plurality of anonymous address parameters. The at least one processor and associated memory, in conjunction with execution of the target dataset analytical program, are configured to condition the target dataset for compatibility with the reference address dataset and for compliance with requirements associated with generating geographical distributions of target parameters of the target dataset, wherein the conditioning is performed to form a first version of a conditioned target dataset with a plurality of conditioned target datapoints. Each conditioned target datapoint is represented by at least the at least one target parameter and the non-personally identifiable address parameters. The at least one processor and associated memory, in conjunction with execution of the target dataset analytical program, are configured to compare the non-personally identifiable address parameters of each conditioned target datapoint of the first version of the conditioned target dataset to the anonymous address parameters of the reference address datapoints of the reference address dataset to determine at least one reference address datapoint with the most matches of non-personally identifiable address parameters to anonymous address parameters for the corresponding conditioned target datapoint or to determine the corresponding conditioned target datapoint does not match any of the plurality of reference address datapoints. The analytics computer system and the conditioned target dataset are for use by a geographical analytics service provider in analyzing the at least one target parameter which is associated with one or more managed service providers to develop geographical distributions of the at least one target parameter.

DETAILED DESCRIPTION

Figure 1:
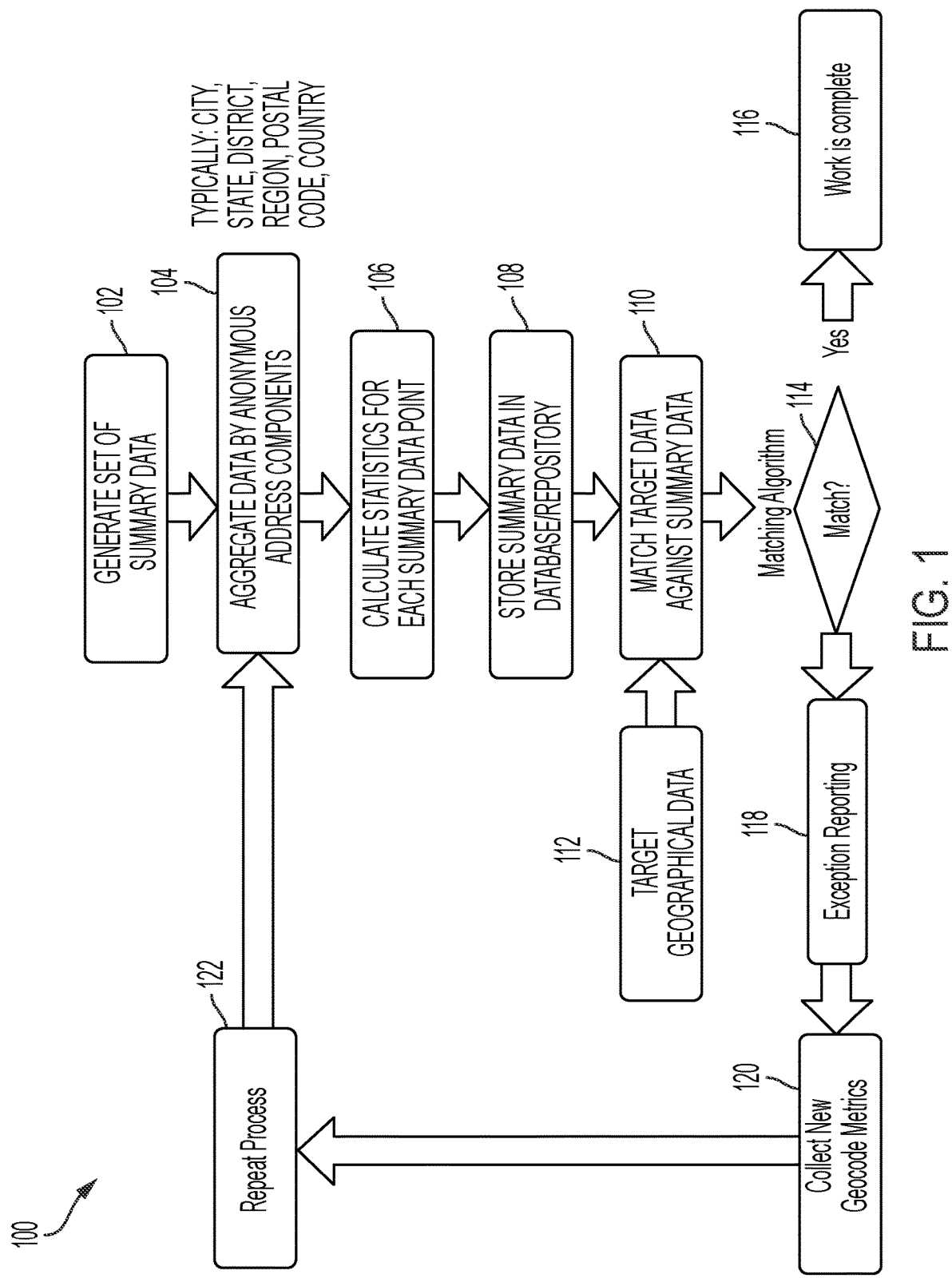
FIG. 1 is a functional diagram of an exemplary embodiment of a process for generating a geographical distribution of a target parameter of a target dataset.

The various embodiments of a reduced address dataset described herein enable a particular level of precision when mapping and reporting on professional services automation (PSA) metrics for a customer (e.g., managed service provider (MSP)) without needing to rely on partial solutions of third-party services, exposing sensitive data to a third party, or having to manage exceptionally large volumes of detailed geographical data.

This paragraph provides definitions and/or examples of certain terms and phrases used herein. The definitions and examples provided below are considered non-limiting and supplemental with respect to descriptions of the corresponding terms and phrases provided throughout this disclosure. Likewise, the definitions and examples provided below are considered non-limiting and supplemental with respect to common definitions known in the applicable art and common dictionary definitions.

Dataset—A collection of data. For example, a dataset can be a database in which the data is arranged in records or datapoints. The datapoints may include elements, fields, or parameters that are linked to form a design structure for the dataset. Datapoints can also be arranged in a tabular format in which one dimension (e.g., row or column) represents the datapoint and the other dimension represents the element, field, or parameter.

Datapoint—A component of a dataset comprising multiple datapoints. For example; a datapoint may include elements, fields, or parameters. A datapoint may also be referred to as a record.

Metric—A standard of quantitative assessment commonly used for measuring, assessing, comparing, evaluating, and tracking performance or production.

Accuracy—The degree to which the result of a measurement, calculation, or specification conforms to the correct value or a standard, Precision—The degree to which results of measurements, calculations, or specifications are close to each other.

Analytics—The systematic computational analysis of data or statistics. For example, analysis of large sets of business data using mathematics, statistics, and a computational system.

Geographical distribution—The distribution of data or information in relation to a geographical area. For example, a target data parameter may be associated with an address parameter or a group of address parameters such that values for the data parameter can be distributed geographically in relation to different values for the address parameter(s), The distribution can be presented graphically on a map or chart or it can be presented in a table using characters or symbols.

Source address dataset—An existing collection of source address datapoints. The source address dataset may be used to generate a reduced address dataset which can be used as a reference address dataset in analyzing target parameters of a target dataset. For example, a source address datapoint of a source address dataset may include detailed address parameters and geographical location parameters. The detailed address parameters may include personally identifiable address parameters.

Source address datapoint—A component of a source address dataset comprising multiple source address datapoints. For example; a source address datapoint may include detailed address parameters and corresponding geographical location parameters. The detailed address parameters may include personally identifiable address parameters and anonymous address parameters.

Detailed address parameters—Parameters represented within datapoints of a dataset. Detailed address parameters include personally identifiable address parameters and anonymous address parameters. For example, a detailed address parameter may represent a personal name, an entity name, a street address, a city, a state, a postal code, a country, a borough, a regional area, a county, or a township.

Personally identifiable address parameter—A parameter represented within datapoints of a dataset. For example, a personally identifiable address parameter may represent a personal name, an entity name, or a street address.

Geographical location parameter—A parameter represented within datapoints of a dataset. For example, a geographical location parameter may represent a longitude, a latitude, or an elevation.

Reduced address dataset—A collection of anonymous address datapoints generated by removing certain data parameters and/or datapoints from a source address dataset. For example, personally identifiable address parameters may be removed from the datapoints of the source address dataset, and geographical location parameters may be removed from the datapoints. For example; an anonymous address datapoint may include anonymous address parameters and corresponding geographical location parameters. Anonymous address parameters may also be referred to as non-personally identifiable address parameters. For example, a reduced address dataset may be used as a reference address dataset to analyze target parameters of a target dataset.

Anonymous address datapoint—A component of a reduced address dataset comprising multiple anonymous address datapoints. For example; an anonymous address datapoint may include anonymous address parameters and corresponding geographical location parameters.

Anonymous address parameter—A parameter represented within datapoints of a dataset. For example, an anonymous address parameter may represent a city, a state, a postal code, a country, a borough, a regional area, a county, or a township.

An anonymous address parameter may also be referred to as a non-personally identifiable address parameter.

Group identifier parameter—A parameter represented within datapoints of a dataset. For example, a group identifier parameter represents an anonymous address parameter or a combination of anonymous address parameters selected for dividing the anonymous address points of a reduced address dataset or reference address dataset into groups based on values of the anonymous address parameter or combination of anonymous address parameters associated with the group identifier parameter. A label for the group identifier parameter may be a code associated with the anonymous address parameter or combination of anonymous address parameters, such as 123 representing a country-state-county combination. Alternatively, the label for the group identifier parameter may be a long form representation of the anonymous address parameter or combination of anonymous address parameters, such as country-state-county.

Group identifier—A value for a group identifier parameter within a datapoint of a dataset. For example, if the group identifier parameter is associated with a combination of anonymous address parameters, such as country-state-county, the group identifier for a particular group of anonymous address datapoints may be characters or codes associated with US, Ohio, and Cuyahoga values for the corresponding anonymous datapoints. Alternatively, the group identifier for the group identifier parameter may be a long form representation, such as US-Ohio-Cuyahoga.

Geographical location metric parameter—A parameter represented within datapoints of a dataset. A geographical location metric parameter is associated with groupings of anonymous address datapoints based on an anonymous address parameter or a combination of anonymous address parameters. A geographical location metric parameter holds a value for a specific type of geographical location metric in relation to the groupings of the anonymous address datapoints, Geographical location metric—A value for a particular geographical location metric parameter within a datapoint of a dataset. Examples of types of geographical location metrics include a quantity of anonymous address datapoints, a two-dimensional geographic area, a maximum longitude, a minimum longitude, an average longitude, a median longitude, a longitude mode, a longitude standard deviation, a maximum latitude, a minimum latitude, an average latitude, a median latitude, a latitude mode, a latitude standard deviation, a maximum elevation, a minimum elevation, an average elevation, a median elevation, an elevation mode, and an elevation standard deviation. Generating a particular geographic location metric results in a value for the metric and a corresponding geographic location metric parameter is set to that value.

Group of anonymous address datapoints—A group is formed by matching values for an anonymous address parameter or a combination of anonymous address parameters of anonymous address datapoints in a reduced address dataset. For example, the combination of anonymous address parameters may be country, state, and county. An exemplary group of anonymous address datapoints based on this combination could include all anonymous address datapoints with US, Ohio, Cuyahoga values for the country, state, and county address parameters. Another group would have a different value for at least one of the anonymous address parameters in the combination.

Reference address dataset—A reduced address dataset used in analyzing target parameters of a target dataset.

Reference address datapoint—A component of a reference address dataset comprising multiple reference address datapoints. For example; a reference address datapoint may include anonymous address parameters, a group identifier parameter(s), and geographical location metric parameters. A reference address datapoint may also be referred to as an anonymous address datapoint.

Target dataset—An existing collection of target data. For example, target datapoints of a target dataset may include a target parameter(s) and reported address parameters. The reported address parameters may include personally identifiable address parameters. The target dataset may be conditioned to be compatible with a reference address dataset in conjunction with analyzing the target parameter(s).

Target datapoint—A component of a target dataset comprising multiple target datapoints. For example; a target datapoint may include a target parameter(s) and corresponding reported address parameters. The reported address parameters may include personally identifiable address parameters and non-personally identifiable address parameters. Non-personally identifiable address parameters may also be referred to as anonymous address parameters.

Target parameter—A parameter represented within target datapoints of a target dataset. For example, a target parameter may represent a monthly recurring revenue, expenses, adaption metrics, utilization metrics, server statistics, end client details, down time, or up time.

Reported address parameter—A parameter represented within target datapoints of a target dataset. For example, a reported address parameter may represent a personal name, an entity name, a street address, a city, a state, a postal code, a country, a borough, a regional area, a county, or a township.

Conditioned target dataset—A collection of conditioned target datapoints formed by processing a target dataset to be compatible with a reference address dataset. The processing of the target dataset may also be for compliance with requirements associated with generating geographical distributions of target parameters of the target dataset and resulting conditioned target dataset, Each conditioned target datapoint includes a target parameter(s) and non-personally identifiable address parameters.

Conditioned target datapoint—A component of a conditioned target dataset comprising multiple conditioned target datapoints. For example; a conditioned target datapoint may include a target parameter(s) and non-personally identifiable address parameters, Non-personally identifiable address parameter—A parameter represented within datapoints of a dataset. For example, a non-personally identifiable address parameter may represent a city, a state, a postal code, a country, a borough, a regional area, a county, or a township. A non-personally identifiable address parameter may also be referred to as an anonymous address parameter.

Matched target datapoint—A component of a conditioned target dataset comprising multiple matched target datapoints. For example; a matched target datapoint may include a target parameter(s) and non-personally identifiable address parameters, A matched target datapoint with a non-personally identifiable address parameter(s) that matched an anonymous address parameter(s) in a reference address datapoint(s) of a reference address dataset.

Merged target datapoint—A component of a conditioned target dataset comprising multiple merged target datapoints. For example; a merged target datapoint may include a target parameter(s), non-personally identifiable address parameters, a group identifier parameter(s), and geographical location metric parameters associated with each group identifier parameter. A merged target datapoint is formed by merging the target parameter(s) and non-personally identifiable address parameters from a matched target datapoint of the conditioned target dataset with the group identifier parameter(s) and geographical location metric parameters in a reference address datapoint(s) of a reference address dataset.

Exceptions dataset—A collection of exceptions datapoints. For example, the exceptions datapoints may be conditioned target datapoints of a conditioned target dataset that did not match any reference address datapoints of a reference address dataset. Each exceptions datapoint may include non-personally identifiable address parameters from the corresponding conditioned target datapoint with which the exceptions datapoint is associated.

Exceptions datapoint—A component of an exceptions dataset comprising multiple exceptions datapoints. For example; an exceptions datapoint may include non-personally identifiable address parameters.

The PSA metrics may include the physical locations of customers (e.g., MSPs), parameters associated with end clients of the customers, locations of business relevant activities, usage parameters, financial parameters, and the like.

The metrics are used to generate PSA analytics, which may be referred to as customer engagement reports. The customer engagement reports can compare a customer's PSA metrics to corresponding metrics of all or a select portion of similarly situated businesses. This requires geographic data to be gathered from a, for example, data warehouse and summarized (i.e., reduced) to be anonymous and more efficient to use. For example, the PSA analytics can provide aggregate product adoption numbers to PSA customers. In many applications global geographical data (e.g., address locations) is an exceptionally large set of information that grows and changes regularly. For certain location-dependent applications, it is necessary to query for the precise location of addresses in order to ship, bill, or otherwise action a specific locale. In other applications, such as reporting applications, there is a need to geocode data at lower levels of precision. The benefits of a lower level of precision can include anonymity, reduced understanding, and reduced data processing, transmission, and storage requirements. The various embodiments of the reduced address dataset and its use as a reference address dataset allows geographic data to be programmatically simplified given a level of precision specified by a consumer of the data being reported.

For reporting and analytics in reference to address data that is subject to compliance, privacy, or other data governance restrictions (such as address data with personally identifiable data (PID) or medical data), the ability to summarize the address data is important as it removes detailed references that could put a company in breach of compliance if that detail were maintained or shared incorrectly, Prior to the address reduction process described herein, the problem was dealt with using techniques such as the following. Licensing access to a third-party product subscription that processes and geocodes data on an ongoing basis; but delivers only a partial solution with the drawback of communicating private data. Use of mapping tools to look up a given address and find longitude and latitude of the given address, and subsequent processing would be performed in some specialized or ad hoc process.

The various embodiments of the reduced address dataset described herein addresses problems such as process effort, maintainability, and privacy, while allowing a large volume of geographical data to be represented into a significantly smaller dataset that provides the precision needed to service a given application.

The various embodiments of methods for generating a reduced address dataset and using the reduced address dataset as a reference address dataset describe a process to convert a large volume of geographical data of high or varying precision into a compact/summarized version that is lightweight enough for use in reporting applications where speed is important, and able to service those applications within a given level of precision. At a high level, the two main processes include: i) creating a compressed dataset based on a large set of existing/detailed geographical source data; and ii) matching address data for a target datapoint of a conditioned target dataset against the compressed data to geocode the target datapoint. In i), the compressed dataset Includes statistics and metrics that allow each datapoint (e.g., geographic area, sub-area, or any combination of anonymous address parameters) to provide some insight into a population distribution for a target parameter of a target dataset. In ii), once matched, the target datapoints can be used in analytics, reporting, dashboarding, etc., of a target parameter represented within the target datapoints.

In an exemplary embodiment, creating a summarized dataset includes: i) aggregating the given geographical data by a chosen set of address components (e.g., anonymous or non-personally identifiable address components) without aggregating by the most precise address component(s) (e.g., personally identifiable address components); and ii) determining and assigning statistics of the geographical data to each datapoint, where a datapoint represents a bounded geographical region composed of aggregated address components for the associated underlying addresses.

In an exemplary embodiment, applying the summarized dataset to target geographical data includes: i) dividing summarized geographical data into N fields in order from most specific/identifying to least specific; ii) receiving target geographical data; iii) performing a series of matches between the summarized dataset and the target geographical data (e.g., address components), and iv) outputting the latitude/longitude for that target address. For example, the output can be used in various business and demographic analytics).

The various embodiments of the reduced address dataset and its use as a reference address dataset are useful for any scenario in which a given level of precision is tolerable, such as with dashboards, visualization, or aggregate analytics. For example, use of the reference address dataset is inexpensive, fast, and does not require transmitting data to outside parties for geocoding. The process also allows for sensitive data to be analyzed without violating privacy/compliance policies.

The various embodiments described herein address various problems associated with the complexity and vastness of a large PSA customer base. Even if the list of customers is not excessively large, each customer may have many locations, each customer may collect data regarding their own end clients, and PSA metrics may be assigned to each of these endpoints. For example, a PSA customer base may include 10,000 accounts across 100,000 locations with a total of 8 million end clients. Each of these, PSA customers may have their own end clients and location-related data. For all of these PSA end clients, metrics can be obtained, such as from service desk usage, logins, opportunity/lead generation, API use, and more.

In a use case example, the end clients of a set of PSA customers associated with an organization can be analyzed. Some goals of this use case may include: i) where/when/how do new end clients appear?: ii) are there patterns that span the PSA customers, geography, timing, or another aspect that would be useful to know?; iii) where are the customers' end clients with relationship to them and each other?; iv) can end client behavior specifics be correlated back to actions/releases by the organization or by the PSA customer, (e.g., in the PSA, can the organization correlate geographical data to tickets created, revenue posted, or contracts signed? or, in remote monitoring management (RMM), can the location of devices be correlated to actions by the organization or activity in the organization's other products?); v) more uses for the organization's data may be discovered every day (e.g., insights can be gained that may be useful in the future even though there is not enough known at this time to make them useful today); and vi) the organization desires maps/charts showing a geographical distribution of target parameters and using compressed address data makes this easier and more efficient.

To localize all of these events using a third-party mapping service that converts addresses to longitudes and latitudes, the process is incomplete, slow, inconvenient, insecure, or all of the above. The various embodiments of the reduced address dataset and its use as a reference address dataset described herein provide the fully required capabilities for PSA customers and/or RMM service providers to manage geographical data for their customers that would free them from reliance on external services offering partial solutions, and that could speed up reporting in such a way that the service provider does not need to allocate extensive computing resources for these needs. The various embodiments described herein also address privacy concerns regarding how much of the customer's data the service provider is allowed to be transmitted to third-party services or even accessed by the service provider.

For example, the inventor used an open source address database as the source address dataset to test processes for generating the reduced address dataset, Consistently, the inventor arrived at the basic summarization process described herein as the simplest and most effective way to get accurate data. The testing led to ordering of data dimensions by level of specificity (precision) and limiting matching to around N permutations (where N is the number of fields used).

With reference to FIG. 1, an exemplary embodiment of a process 100 for generating a geographical distribution of a target parameter of a target dataset is shown. For example, a large volume of geographical data of high or varying precision is converted into a compact/summarized version that is lightweight enough for use in reporting applications where speed is important, and able to service those applications within a given level of precision. The process begins at 102 where a set of summary geographical data is generated from a set of detailed source geographical data. At 104, the given geographical data is aggregated by anonymous address components. The summary geographic data of the given dataset includes addresses specified by anonymous components, such as zip code, country, city, etc. The summary geographical data is aggregated by a chosen set of the anonymous address components. The summary geographical data is not aggregated by the personally identifiable addresses and street numbers (i.e., the most precise address component(s)). The address components can be different in different jurisdictions. For example, different address components are used in different countries. At 106, statistics for each aggregated datapoint are calculated. Statistical data (e.g., average, median, mode, standard deviation, minimum and maximum of longitude and latitude) is determined and assigned to each datapoint. A group of datapoints is a geographical region (e.g., an area bounded by a set of maximum and minimum latitudes and longitudes) associated with address components having values related to the geographical region. The geographical region is based on the aggregated address components for the associated underlying address component values. At 108, the aggregated data is stored in a database/repository.

At 110, the summarized dataset is applied to target geographical data received from 112. The summarized geographical data is divided into N fields in order from most specific/identifying to least specific. For N geographic components, order the components with the most unique value to the least unique values. For example, how many countries (few unique values), how many states (50 unique values), how many counties (thousands of unique values). At 114, a matching algorithm is used to match the sample data against the aggregate data. For example, a series of matches are performed between the summarized dataset and the target geographical data (address data). Performance of the algorithm includes matching all N fields, matching N−1 of the most specific fields, matching fields in order of precision once for N−2, N−3, etc. If addresses remain, the process is repeated for N−2 fields, omitting the two most specific, continuing to N−3 fields, N−4 fields, etc. At 116, the latitude/longitude for the target address is output and the work is complete. For example, the output can be used in various business and demographic analytics. Alternatively, the N files can be matched in any order preferred for the given application or target dataset.

At 118, exception reporting is performed for target geographical data that is not matched to any aggregate data by the matching algorithm. At 120, new geocode metrics are collected for the target geographical data that was not matched. At 122, the process 100 continues by repeating 104 through 114. It is important to know that exception management can be applied to various types of geocoding processes, regardless of how the data is presented. The process 100 benefits from allowing exceptions to be summarized prior to management which enables less data review as the datapoint count is significantly reduced.

The size of summarized data in experiments by the inventor was consistently 0.4%-0.6% the size of the detailed data by volume. The precision of the summarized data (e.g., sets of minimum, maximum, average, median, and standard deviation of longitude and latitude) was on average within 1-2 km of the original detailed address data used to create the summarized dataset and the received target addresses. Large/less populated regions tended to be matched to the least precise summarized data whereas cities and urban centers tended to be most precise.

The various embodiments of generating a reduced address dataset and using it as a reference address dataset to generate a geographical distribution for a target parameter in a conditioned target dataset described herein maintain a suitable level of privacy and anonymity for address data and target parameters. For example, the resulting geographical data does not contain enough detail to pose contractual or data privacy concerns.

The reduced address dataset is highly compressed. For example, by not relying on 1:1 or data submission processes to manage geographical data, the need to transmit large volumes of data to external services is avoided and the need for internal systems to process the data is reduced. This also reduces the amount of data storage capacity needed to store the data, as well as the amount that needs to be sent to external services for geocoding. Any solution that relies on an external service for 1:1 comparisons will require uncompressed data to be sent, geocoded, and retrieved for use.

The geographical distribution of the target parameter is as precise as needed for a given request for the distribution from a given reporting application. In contrast, most geocoding services focus on accuracy, and provide exact coding of an address into an accurate latitude/longitude pair. For example, some applications require exceptional accuracy, such as a GPS or mail-tracking program, but in most reporting/analytical applications less accuracy is required, while a specified level of precision is preferred. The higher the accuracy, the larger the data becomes and the more effort that is required to transmit, store, and process that data. By adjusting the number of inputs, the process can provide the required precision. This also determines the level of anonymization that occurs.

The various embodiments of generating a reduced address dataset and using it as a reference address dataset to generate a geographical distribution for a target parameter in a conditioned target dataset described herein is an automated process. In contrast, many of solutions require some level of manual intervention. For example, Google Maps relies heavily on crowd-sourced data to maintain the level of accuracy needed. Many open source projects, such as OpenStreetMap, also are reliant on people manually entering, updating, or maintaining the data. In the various embodiments described herein, both data generation and data validation can be automated with anomalies being self-corrected as outliers or new datapoints. As long as anomalies fall within the tolerance of the specified reporting application, there is no need to fall back to manual data management methods.

The various embodiments disclosed herein organically group data into data clusters. Thus, the process is not bound to existing maps, such as state, county, zip code, district, etc. In fact, the process does not need to generate a map and fit data to the map, but instead allows the data to generate its own map that can then be compared to a similarly clustered set of known geographical data. This frees the process from pre-aggregating data or otherwise being forced to choose grouping methods prior to the time of application. The resulting data can be grouped in an optimized or alternate fashion dictated by a given application with no significant code or data changes.

The summarized data generated by the various embodiments disclosed herein can come from any source; whether open-source or not, or from previously geocoded data. For example, OpenStreetMap was used for testing and a desirable level of precision was achieved despite not processing their most detailed datasets, Geographical data does drift over time, but because the data is summarized, the drift takes far longer to manifest itself as significant location errors when applying it to target data. A new address in an existing town will geocode successfully and sufficiently to their next-door-neighbor's latitude and longitude. Unless a completely new geography framework is created, such as with a new city or new postal code, this drift can be managed when exceptions are noted in the matching process, which will be infrequent. Statistics such as median and standard deviation may shift over time, but that shift will be slow enough so as to not significantly degrade the usefulness of the metrics. Maintenance is managed via exception tracking. If exceptions are erroneous data, then they are dealt with as they would have been via any other process prior to this one. If exceptions are legitimate addresses that do not yield a match to address parameters in the reference dataset, an exception handling process can be used to determine why and the reference dataset can be updated as needed. This scenario is rare and indicates some drastic change in geographical data that has been unaccounted for.

Figure 2:
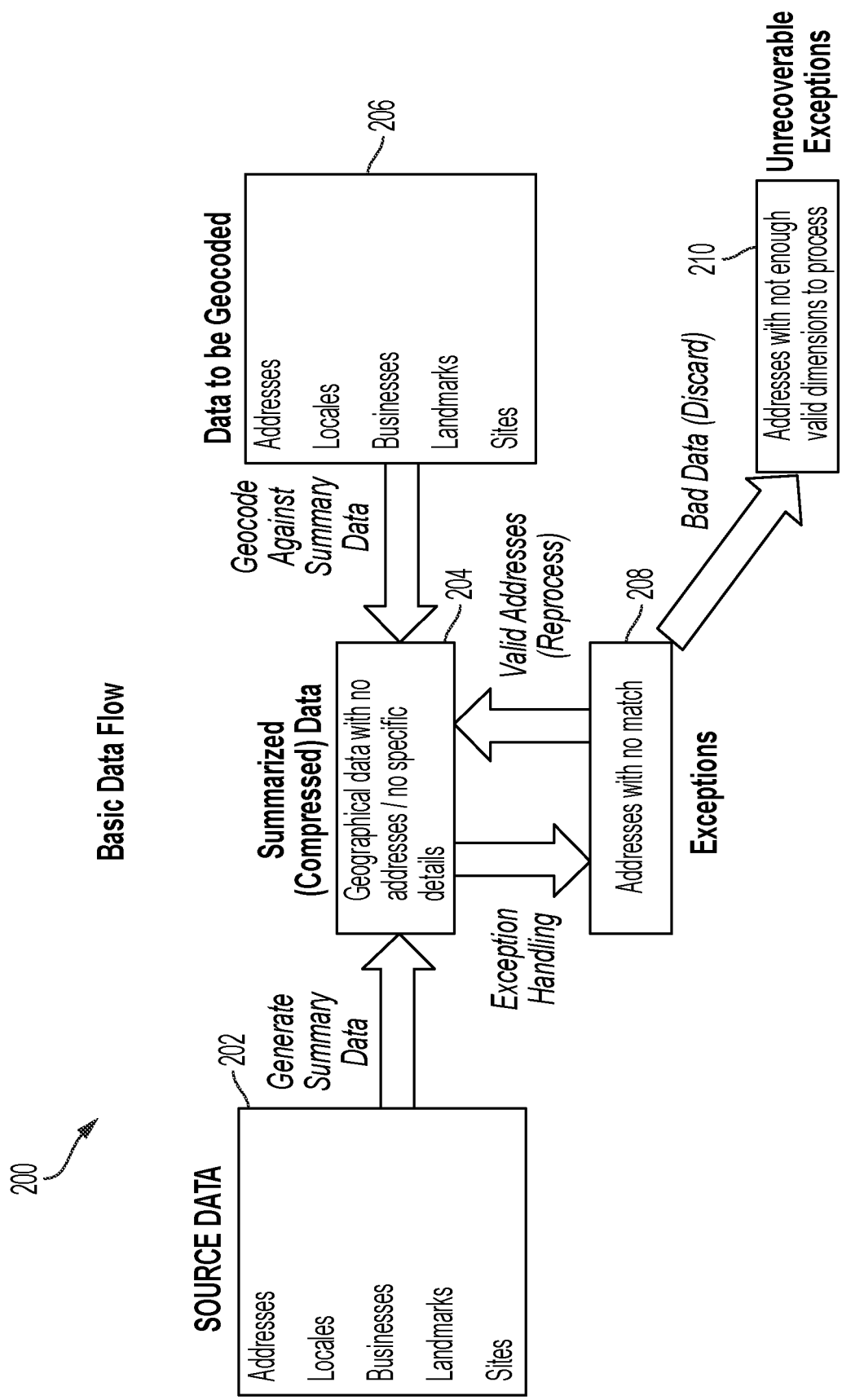
FIG. 2 is a functional diagram of another exemplary embodiment of a process for generating a geographical distribution of a target parameter of a target dataset.

With reference to FIG. 2, another exemplary embodiment of a process 200 for generating a geographical distribution of a target parameter of a target dataset begins at 202 where source geographical data, such as addresses, locales, businesses, landmarks, sites, etc., is received from a geographical data source. At 204, that source geographical data is used to generate summary data. The summary data is geographical data with specific address details in the source geographical data removed. The summary data is also referred to as summarized data, compressed data, and reduced data. At 206, target data to be geocoded is received from a target data source. The target data includes addresses, locales, businesses, landmarks, sites, etc. At 204, the target data is geocoded against the summary data, Target data that does not match any summary data is considered an exception. At 208, an exceptions handler receives target data that did not match any summary data and determines if the target data includes a valid address or bad data (i.e., data that is erroneous, misleading, and/or not compliant with a predetermined syntax). If the target data includes a valid address, the target data is returned to 204 for re-processing. If the target data is bad data, it is considered an unrecoverable exception. At 210, an unrecoverable exception handler receives target data that is bad data and discards the target data. For example, the target data is considered bad data where the address does not include enough valid dimension to process and match with summarized data. Bad target data may be routed to the target data source for further disposition.

The various embodiments of generating a reduced address dataset described herein permit managing and customizing of precision for summarized geographical data included in the reduced address dataset. Precision is controlled by the level of specificity of address components that are used in the geocoding. The process can use metrics such as standard deviation to estimate aggregate precision. Using this data, the process can customize precision, if needed. For example, if a lower precision is desired, the process could accomplish this by: i) summarizing further, removing added levels of geographical information; and ii) rounding latitude and longitude. In i), further summarizing is useful as it is simple, but bears the precision of a clustering algorithm and is hard to fine-tune and control. In ii), the rounding automatically removes precision based on a very specific level of tuning indicated by the amount of rounding. For example, rounding degrees to the thousandths place in latitude would force data to be (on average) no more precise than 0.07 miles. Rounding degrees to the nearest whole number of latitude would reduce average precision to 69 miles.

Standard deviation provides detail on the data distribution and expected precision for a given source address dataset. For example, consider the town of Eben am Achensee, Austria. For the postcode 6212, there are a total of 867 addresses in a row of summary data. For this source address datapoint, the longitude average is 11.7456558 degrees and the standard deviation of the longitude is 0.0085659 degrees. This means that one standard deviation of data (about 68%) falls between 11.7370899 degrees and 11.7542217 degrees and two standard deviations (about 95%) fall between 11.728524 degrees and 11.7627876 degrees. For reference, a standard deviation of 0.0085659 degrees translates to only approximately 0.47 miles of variation from the statistical average. The statistical metrics reflect the density of underlying data and the distribution of addresses within a given summarized geographical area as well as the probability that a given source address datapoint falls within a level of precision and a mean of the distribution.

For a large source address set of data, there is suitable confidence that an address distribution will fall within the expected range of precision as guided by its standard deviation. Given that knowledge, one can reverse engineer the latitude and longitude values via rounding to reduce precision if a reporting need required data with less detail. Rounding these numbers, as well as the standard deviation values would reduce precision and cause more addresses to coalesce on a variety of less precise boundaries. To further understand overall precision, one can: i) multiply the address count for each summarized datapoint by the standard deviation values; ii) sum these numbers across any geographical boundaries; and iii) compute the average standard deviation as weighted by population density in a given region.

Figure 3:
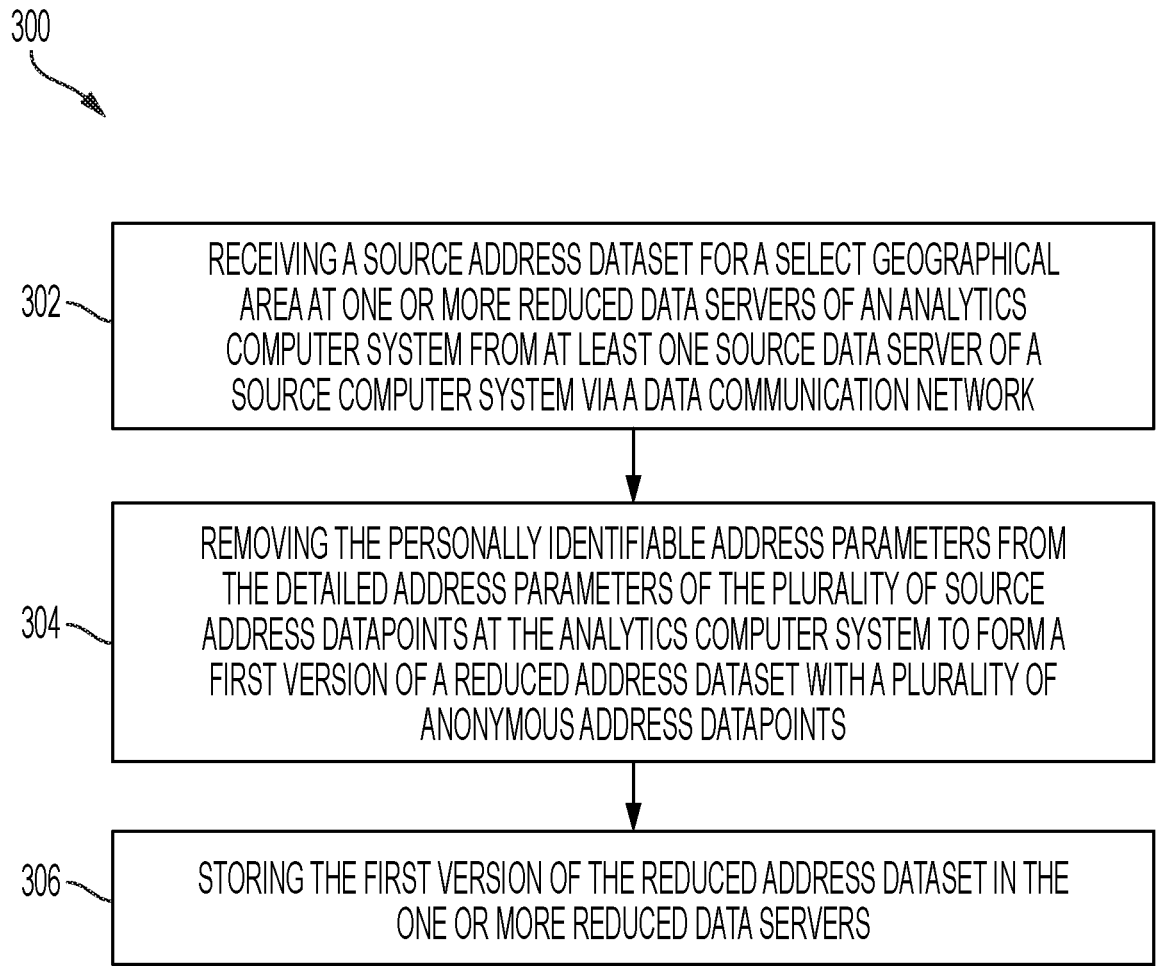
FIG. 3 is a flow chart of an exemplary embodiment of a process for generating a reduced dataset for a geographical area.

With reference to FIG. 3, an exemplary embodiment of a process 300 for generating a reduced address dataset for a geographical area begins at 302 where a source address dataset for a select geographical area is received at one or more reduced data servers of an analytics computer system from at least one source data server of a source computer system via a data communication network. The source address dataset includes a plurality of source address datapoints. Each source address datapoint is represented by detailed address parameters and corresponding geographical location parameters. The detailed address parameters include personally identifiable address parameters and anonymous address parameters. At 304, the personally identifiable address parameters are removed from the detailed address parameters of the plurality of source address datapoints at the analytics computer system to form a first version of a reduced address dataset with a plurality of anonymous address datapoints. Each anonymous address datapoint is represented by the anonymous address parameters and the geographical location parameters. At 306, the first version of the reduced address dataset is stored in the one or more reduced data servers. The reduced address dataset is for use by a geographical analytics service provider as a reference address dataset in analyzing target parameters in a target dataset associated with one or more managed service providers to develop geographical distributions of the target parameters.

In another embodiment of the process 300, the select geographical area includes one of our planet, a hemisphere, one or more continent, one or more country, one or more regional area, one or more state, and any other suitable geographical area. In a further embodiment, the one or more regional area includes at least one of a regional area of a continent, a regional area of a country, a regional area of a state, and any other suitable regional area.

In yet another embodiment of the process 300, the source address dataset includes a plurality of source address datasets. Each source address dataset being associated a predefined geographical area. In a further embodiment, the plurality of source address datasets are at least partially overlapping.

In still another embodiment of the process 300, the detailed address parameters include any combination of a personal name, an entity name, a street address, a city, a state, a postal code, a country, a borough, a regional area, a county, a township, and any other suitable detailed address parameter. In a further embodiment, the regional area includes at least one of a regional area of a city, a regional area of a state, a regional area of a country, a regional area of a borough, a regional area of a county, a regional area of a township, and any other suitable regional area.

In still yet another embodiment of the process 300, the personally identifiable address parameters include any combination of a personal name, an entity name, a street address, and any other suitable personally identifiable address parameter. In another embodiment of the process 300, the anonymous address parameters include any combination of a city, a state, a postal code, a country, a borough, a regional area, a county, a township, and any other suitable anonymous address parameter. In yet another embodiment of the process 300, the geographical location parameters include any combination of a longitude, a latitude, an elevation, and any other suitable geographical location parameter. In still another embodiment of the process 300, the first version of the reduced address dataset is for use by the geographical analytics service provider in developing analytical tools for analyzing the target parameters in the target dataset.

Figure 4:
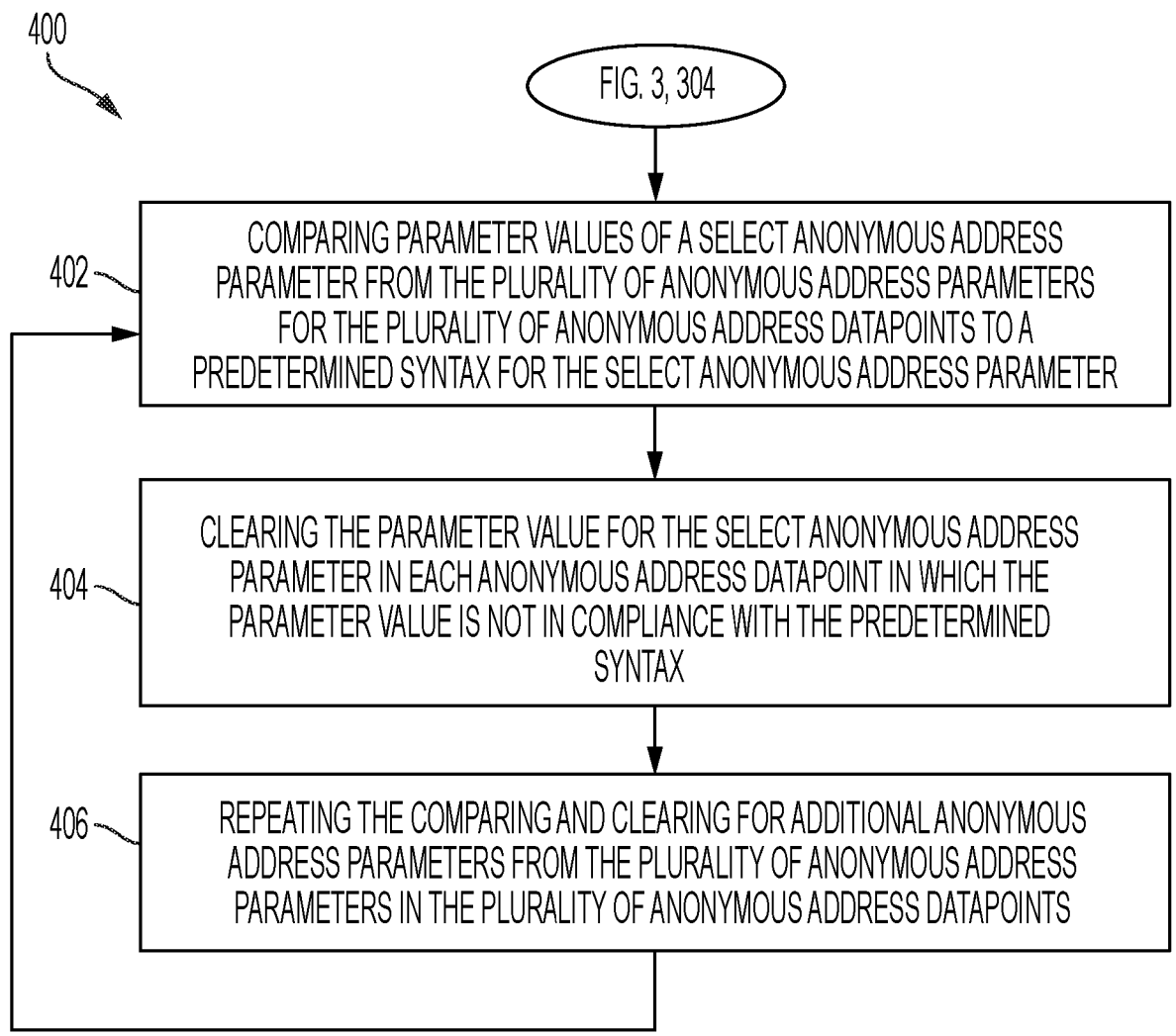
FIG. 4, in combination with FIG. 3, is a flow chart of another exemplary embodiment of a process for generating a reduced dataset for a geographical area.

With reference to FIGS. 3 and 4, another exemplary embodiment of a process 400 for generating a reduced address dataset for a geographical area includes the process 300 of FIG. 3 and continues from 304 to 402 where parameter values of a select anonymous address parameter from the plurality of anonymous address parameters for the plurality of anonymous address datapoints are compared to a predetermined syntax for the select anonymous address parameter. At 404, the parameter value for the select anonymous address parameter is cleared in each anonymous address datapoint in which the parameter value is not in compliance with the predetermined syntax. Optionally, the process 400 continues to 406 where the comparing (402) and clearing (404) are repeated for additional anonymous address parameters from the plurality of anonymous address parameters in the plurality of anonymous address datapoints. The comparing for additional anonymous address parameters is to predetermined syntaxes for the corresponding anonymous address parameters.

Figure 5:
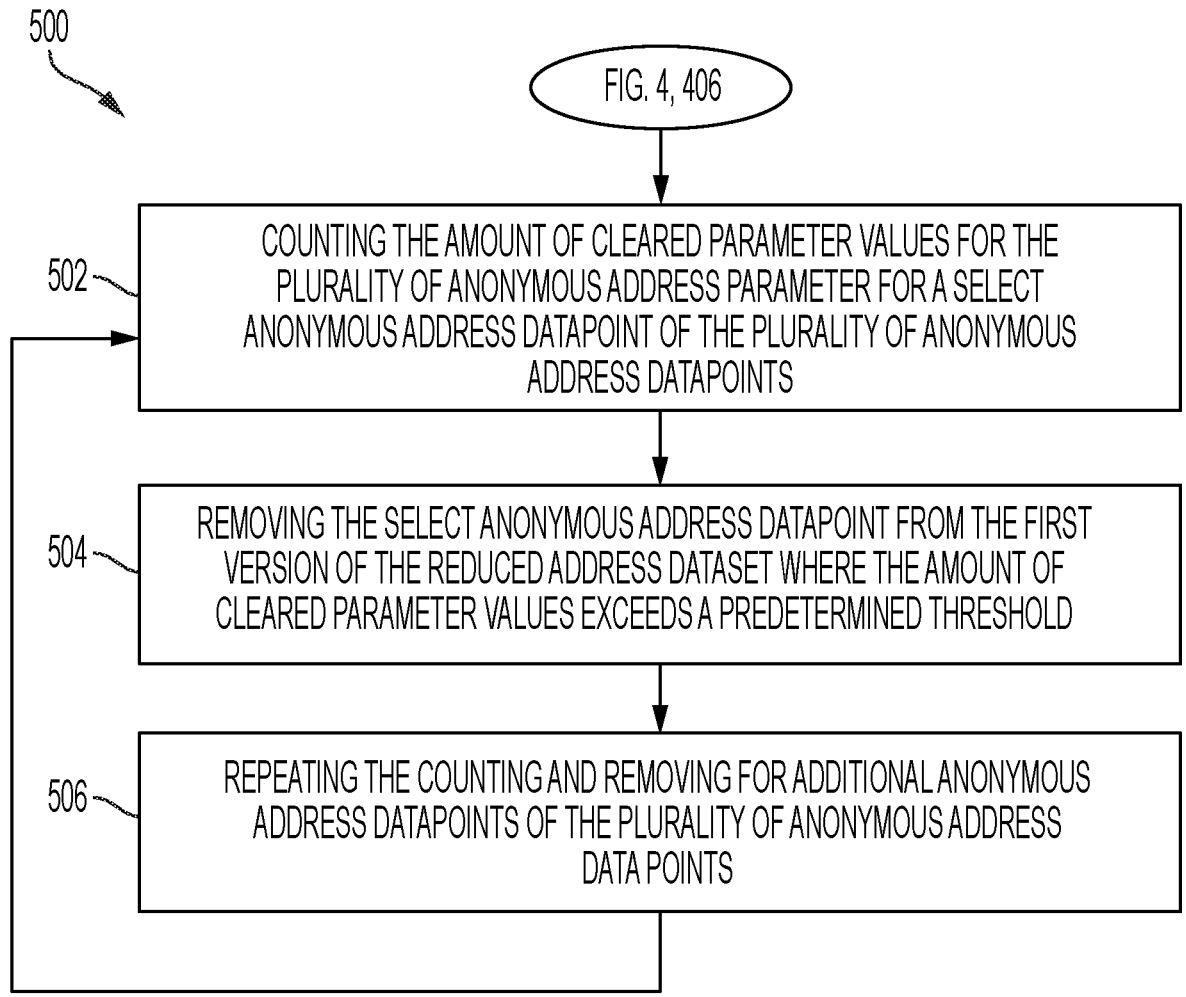
FIG. 5, in combination with FIGS. 3 and 4, is a flow chart of yet another exemplary embodiment of a process for generating a reduced dataset for a geographical area.

With reference to FIGS. 3-5, yet another exemplary embodiment of a process 500 for generating a reduced address dataset for a geographical area includes the processes 300, 400 of FIGS. 3 and 4 and continues from 406 to 502 where the amount of cleared parameter values for the plurality of anonymous address parameters for a select anonymous address datapoint of the plurality of anonymous address datapoints are counted. At 504, the select anonymous address datapoint is removed from the first version of the reduced address dataset where the amount of cleared parameter values exceeds a predetermined threshold. At 506, the counting (502) and removing (504) are repeated for additional anonymous address datapoints of the plurality of anonymous address datapoints.

Figure 6:
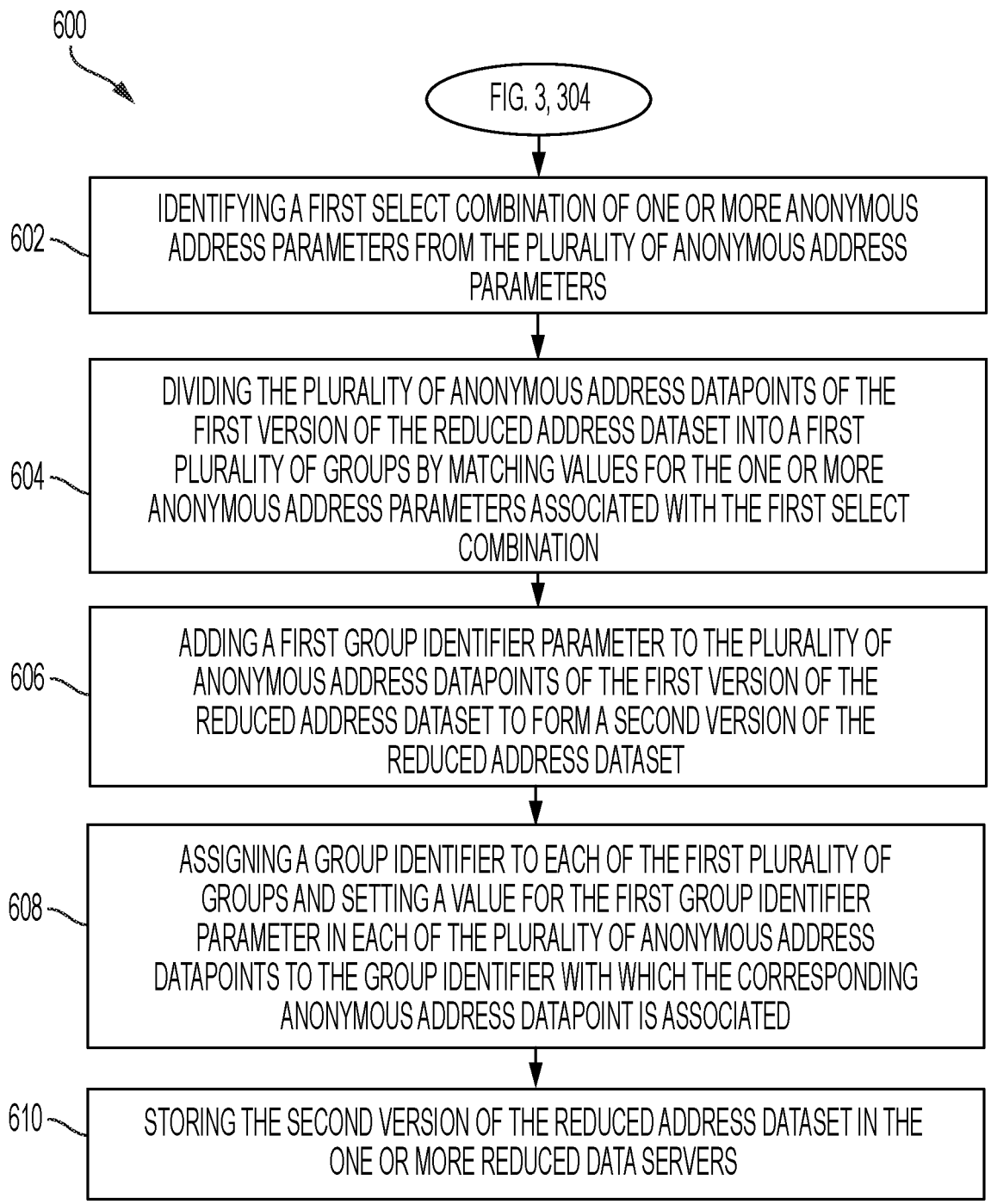
FIG. 6, in combination with FIG. 3, is a flow chart of still another exemplary embodiment of a process for generating a reduced dataset for a geographical area.

With reference to FIGS. 3 and 6, still another exemplary embodiment of a process 600 for generating a reduced address dataset for a geographical area includes the process 300 of FIG. 3 and continues from 304 to 602 where a first select combination of one or more anonymous address parameters from the plurality of anonymous address parameters is identified. At 604, the plurality of anonymous address datapoints of the first version of the reduced address dataset are divided into a first plurality of groups by matching values for the one or more anonymous address parameters associated with the first select combination. At 606, a first group identifier parameter is added to the plurality of anonymous address datapoints of the first version of the reduced address dataset to form a second version of the reduced address dataset, Each anonymous address datapoint of the second version of the reduced address dataset is represented by the anonymous address parameters, the first group identifier parameter, and the geographical location parameters. At 608, a group identifier is assigned to each of the first plurality of groups and a value for the first group identifier parameter in each of the plurality of anonymous address datapoints is set to the group identifier with which the corresponding anonymous address datapoint is associated. At 610, the second version of the reduced address dataset is stored in the one or more reduced data servers.

Figure 7:
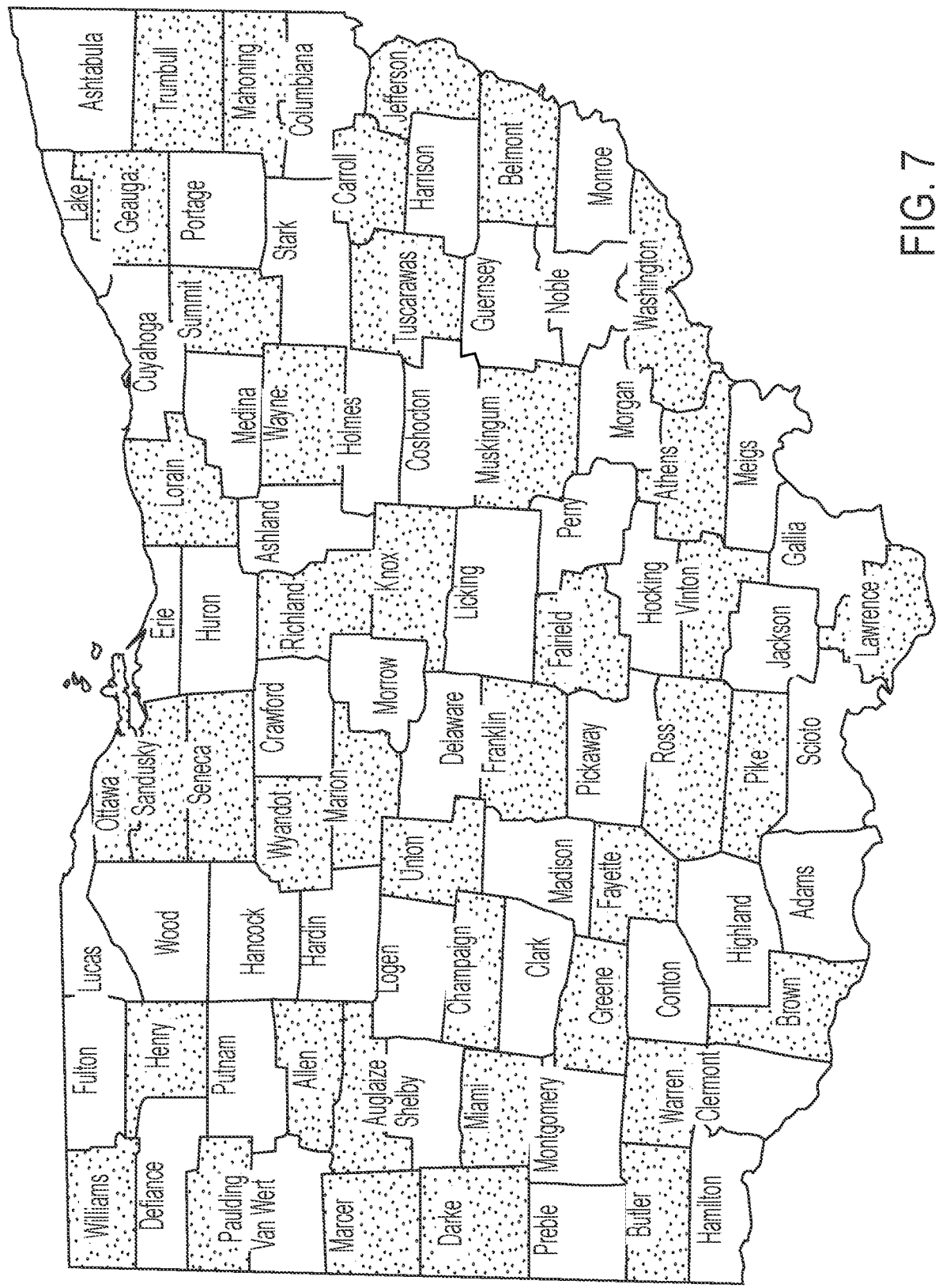
FIG. 7 provides a map of the state of Ohio that serves as an exemplary geographical area and identifies counties within the state.

With reference to FIG. 7, a map of the state of Ohio is shown as an exemplary geographical area. The Ohio map identifies the counties (e.g., Defiance, Cuyahoga, Ashtabula, etc.). For example, an anonymous address parameter combination of country (i.e., United States), state (i.e., Ohio), and county (e.g., Cuyahoga) would be sufficient to identify Ohio counties. Anonymous address datapoints can be divided into country-state-county groups in which country and state are matched to United States, Ohio and the groups are distinguished by county (e.g.; Defiance, Cuyahoga, Ashtabula, etc.). Of course, the anonymous address parameters of the anonymous datapoints could also include city (e.g., Cleveland), postal code (e.g., 44115), and other anonymous address parameters. However, where the select combination is country-state-county other anonymous address parameters are not determinative of the groupings. A group identifier parameter added to the anonymous address datapoints for the country-state-county combination could be referred to as a country-state-county group identifier parameter. Values for the country-state-county group identifier parameter are assigned based on the country-state-county address parameter values. For example, group identifier parameter values could be set to United States-Ohio-Defiance, United States-Ohio-Cuyahoga, United States-Ohio-Ashtabula, etc. for corresponding anonymous address datapoints. Alternatively, the group identifier parameter values could be set to codes representing the different country-state-county combinations such as USOH01 (e.g., Defiance), USOH02 (e.g., Cuyahoga), and USOH03 (e.g., Ashtabula).

In still another embodiment of the process 600, the one or more anonymous address parameters associated with the first select combination includes the plurality of anonymous address parameters associated with the plurality of anonymous address datapoints.

In still yet another embodiment of the process 600, the one or more anonymous address parameters associated with the first select combination are related in an address hierarchy that includes at least one of a broad address parameter, at least one intermediate address parameter, and a narrow address parameter. In a further embodiment, the broad address parameter is one of a country parameter, a state parameter, a borough parameter, a regional area parameter, a county parameter, and any other suitable broad address parameter. In another further embodiment, the at least one intermediate address parameter includes any combination of a state parameter, a borough parameter, a city parameter, a regional area parameter, a county parameter, a township parameter, and any other suitable intermediate address parameter. In yet another further embodiment, the narrow address parameter is one of a borough parameter, a city parameter, a postal code parameter, a county parameter, a township parameter, and any other suitable narrow address parameter. In still another further embodiment, each group of anonymous address datapoints of the second version of the reduced address dataset is represented by a different combination of values for the broad address parameter, the at least one intermediate address parameter, and the narrow address parameter. In still yet another further embodiment, each group of anonymous address datapoints of the second version of the reduced address dataset is represented by a different combination of values for the broad address parameter and the at least one intermediate address parameter. In another further embodiment, each group of anonymous address datapoints of the second version of the reduced address dataset is represented by a different combination of values for the broad address parameter.

In another embodiment of the process 600, the one or more anonymous address parameters associated with the first select combination include one of country and regional area parameters, country and state parameters, country and postal code parameters, regional area and state parameters, regional area and postal code parameters, state and county parameters, state and township parameters, state and borough parameters, state and city parameters, state and postal code parameters, county and postal code parameters, township and postal code parameters, borough and postal code parameters, city and postal code parameters, and any suitable combination of two or more anonymous address parameters.

In yet another embodiment of the process 600, the second version of the reduced address dataset is for use by the geographical analytics service provider in developing analytical tools for analyzing the target parameters in the target dataset.

Figure 8:
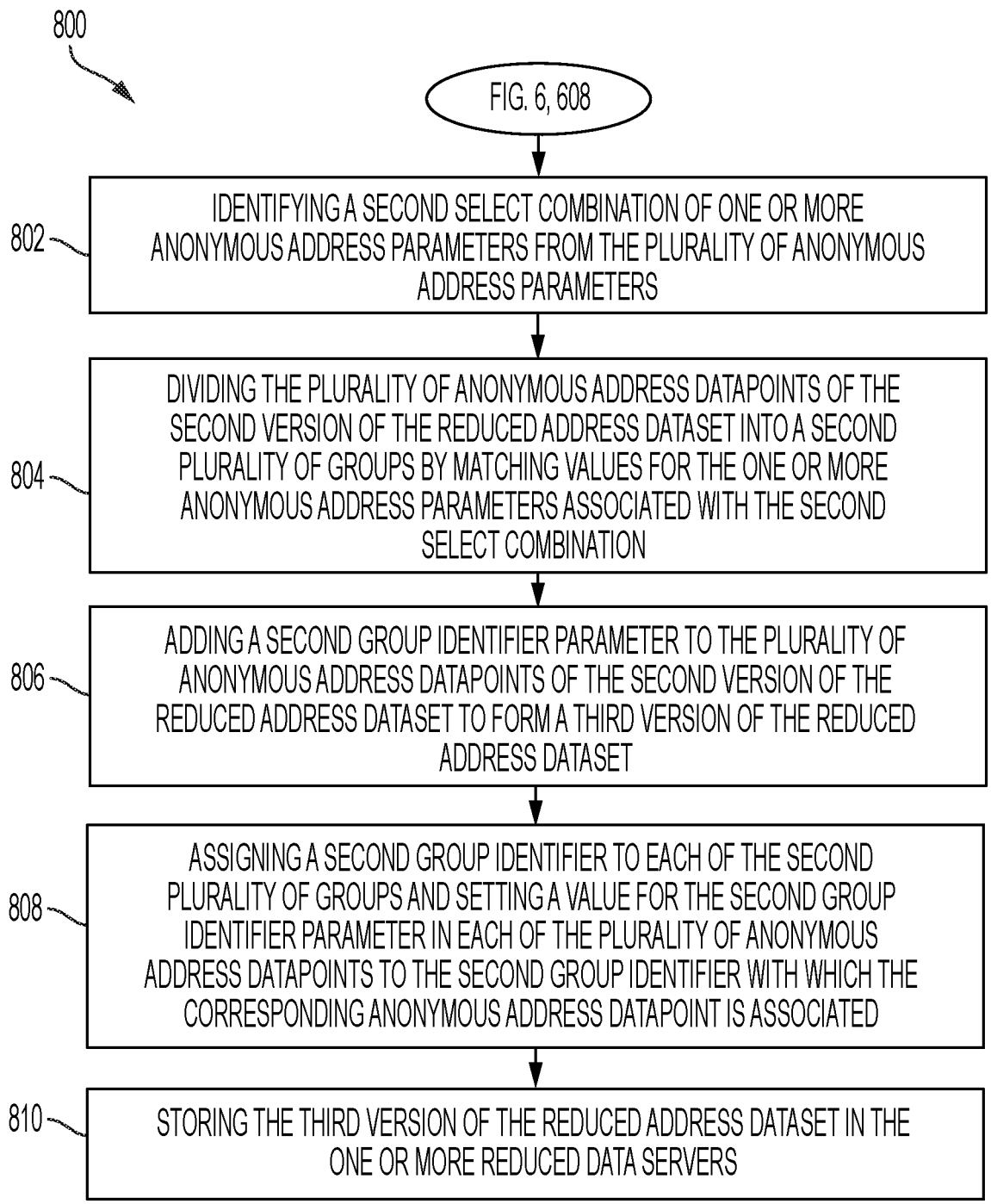
FIG. 8, in combination with FIGS. 3 and 6, is a flow chart of still yet another exemplary embodiment of a process for generating a reduced dataset for a geographical area.

With reference to FIGS. 3, 6, and 8, still yet another exemplary embodiment of a process 800 for generating a reduced address dataset for a geographical area includes the processes 300, 600 of FIGS. 3 and 6 and continues from 608 to 802 where a second select combination of one or more anonymous address parameters from the plurality of anonymous address parameters is identified. The second select combination is different from the first select combination. At 804, the plurality of anonymous address datapoints of the second version of the reduced address dataset are divided into a second plurality of groups by matching values for the one or more anonymous address parameters associated with the second select combination. At 806, a second group identifier parameter is added to the plurality of anonymous address datapoints of the second version of the reduced address dataset to form a third version of the reduced address dataset. Each anonymous address datapoint of the third version of the reduced address dataset is represented by the anonymous address parameters, the first group identifier parameter, the second group identifier parameter, and the geographical location parameters. At 808, a second group identifier is assigned to each of the second plurality of groups and a value for the second group identifier parameter in each of the plurality of anonymous address datapoints is set to the second group identifier with which the corresponding anonymous address datapoint is associated. At 810, the third version of the reduced address dataset is stored in the one or more reduced data servers.

In another embodiment, the process 800 also includes removing the first group identifier parameter from the third version of the reduced address dataset. Each anonymous address datapoint of the third version of the reduced address dataset is represented by the anonymous address parameters, the second group identifier parameter, and the geographical location parameters.

Figure 9:
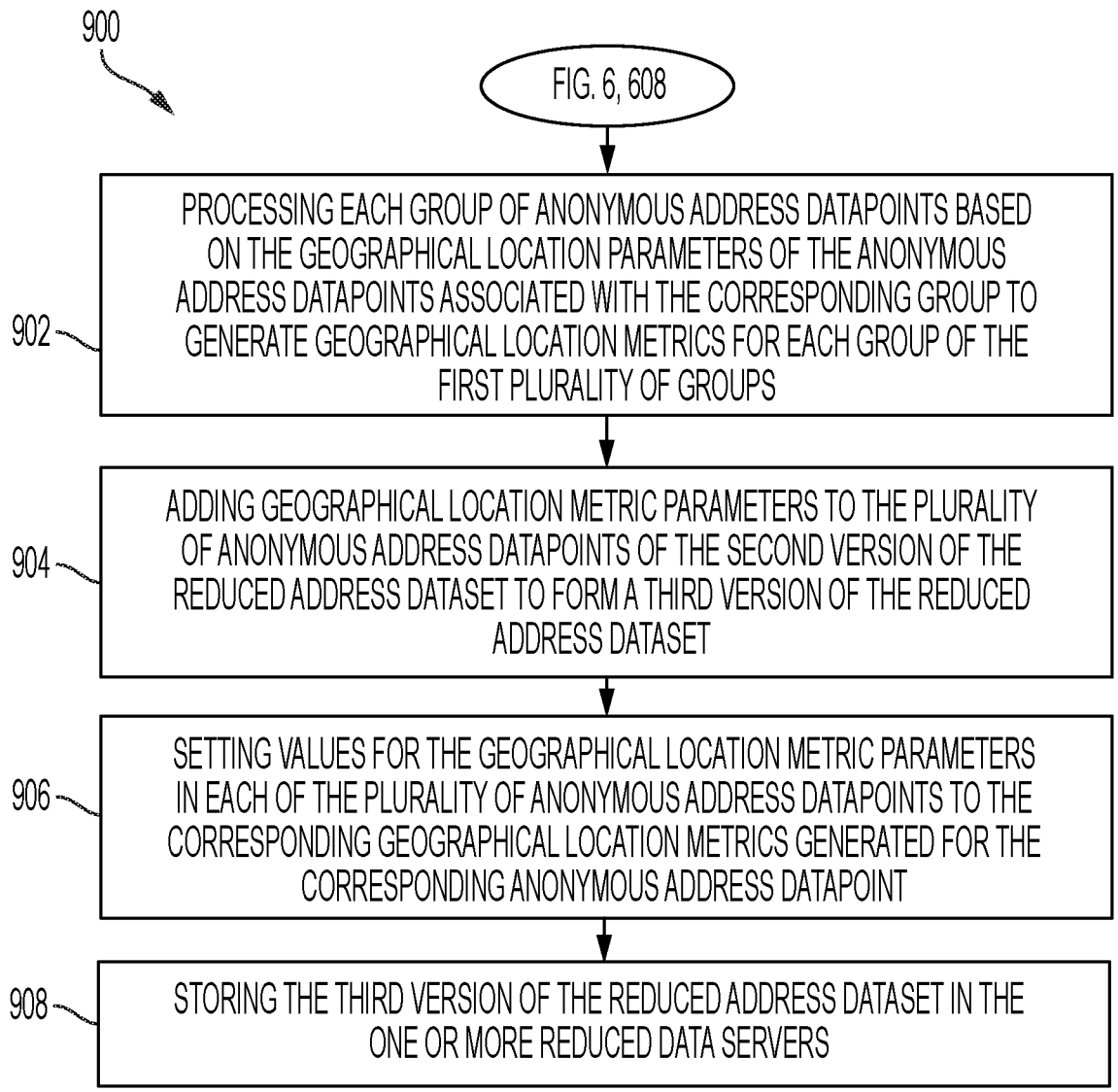
FIG. 9, in combination with FIGS. 3 and 6, is a flow chart of another exemplary embodiment of a process for generating a reduced dataset for a geographical area.

With reference to FIGS. 3, 6, and 9, another exemplary embodiment of a process 900 for generating a reduced address dataset for a geographical area includes the processes 300, 600 of FIGS. 3 and 6 and continues from 608 to 902 where each group of anonymous address datapoints is processed based on the geographical location parameters of the anonymous address datapoints associated with the corresponding group to generate geographical location metrics for each group of the first plurality of groups. At 904, geographical location metric parameters are added to the plurality of anonymous address datapoints of the second version of the reduced address dataset to form a third version of the reduced address dataset. The geographical location metric parameters correspond to the generated geographical location metrics. Each anonymous address datapoint of the third version of the reduced address dataset is represented by the anonymous address parameters, the first group identifier parameter, the geographical location parameters, and the geographical location metric parameters. At 906, values for the geographical location metric parameters are set in each of the plurality of anonymous address datapoints to the corresponding geographical location metrics generated for the corresponding anonymous address datapoint. At 908, the third version of the reduced address dataset is stored in the one or more reduced data servers.

In another embodiment of the process 900, the geographical location metrics for each group include a quantity of anonymous address datapoints associated with the corresponding group. In yet another embodiment of the process 900, the geographical location metrics for each group include a two-dimensional geometric area associated with the corresponding group.

In still another embodiment of the process 900, the geographical location metrics for each group include any combination of a maximum longitude, a minimum longitude, an average longitude, a median longitude, a longitude mode, a longitude standard deviation, and any other suitable geographical location metric. In a further embodiment, the process 900 also includes trimming at least one of the maximum longitude and the minimum longitude for at least one group of anonymous address datapoints based on the corresponding maximum longitude or minimum longitude exceeding a predetermined threshold in relation to a central tendency for longitude. Then, repeating the processing (902) of the anonymous address datapoints associated with the corresponding group to re-generate the geographical location metrics for the corresponding group. Then, revising the values (906) for the geographical location metric parameters for the anonymous address datapoints associated with the corresponding group to the corresponding re-generated geographical location metrics.

In still yet another embodiment of the process 900, the geographical location metrics for each group include any combination of a maximum latitude, a minimum latitude, an average latitude, a median latitude, a latitude mode, a latitude standard deviation, and any other suitable geographical location metric. In a further embodiment, the process 900 also includes trimming at least one of the maximum latitude and the minimum latitude for at least one group of anonymous address datapoints based on the corresponding maximum latitude or minimum latitude exceeding a predetermined threshold in relation to a central tendency for latitude. Then, repeating the processing (902) of the anonymous address datapoints associated with the corresponding group to re-generate the geographical location metrics for the corresponding group. Then, revising the values (906) for the geographical location metric parameters for the anonymous address datapoints associated with the corresponding group to the corresponding re-generated geographical location metrics.

In another embodiment of the process 900, the geographical location metrics for each group include any combination of a maximum elevation, a minimum elevation, an average elevation, a median elevation, an elevation mode, an elevation standard deviation, and any other suitable geographical location metric. In a further embodiment, the process 900 also includes trimming at least one of the maximum elevation and the minimum elevation for at least one group of anonymous address datapoints based on the corresponding maximum elevation or minimum elevation exceeding a predetermined threshold in relation to a central tendency for elevation. Then, repeating the processing (902) of the anonymous address datapoints associated with the corresponding group to re-generate the geographical location metrics for the corresponding group. Then, revising the values (906) for the geographical location metric parameters for the anonymous address datapoints associated with the corresponding group to the corresponding re-generated geographical location metrics.

In yet another embodiment of the process 900, the third version of the reduced address dataset is for use by the geographical analytics service provider in developing analytical tools for analyzing the target parameters in the target dataset.

Figure 10:
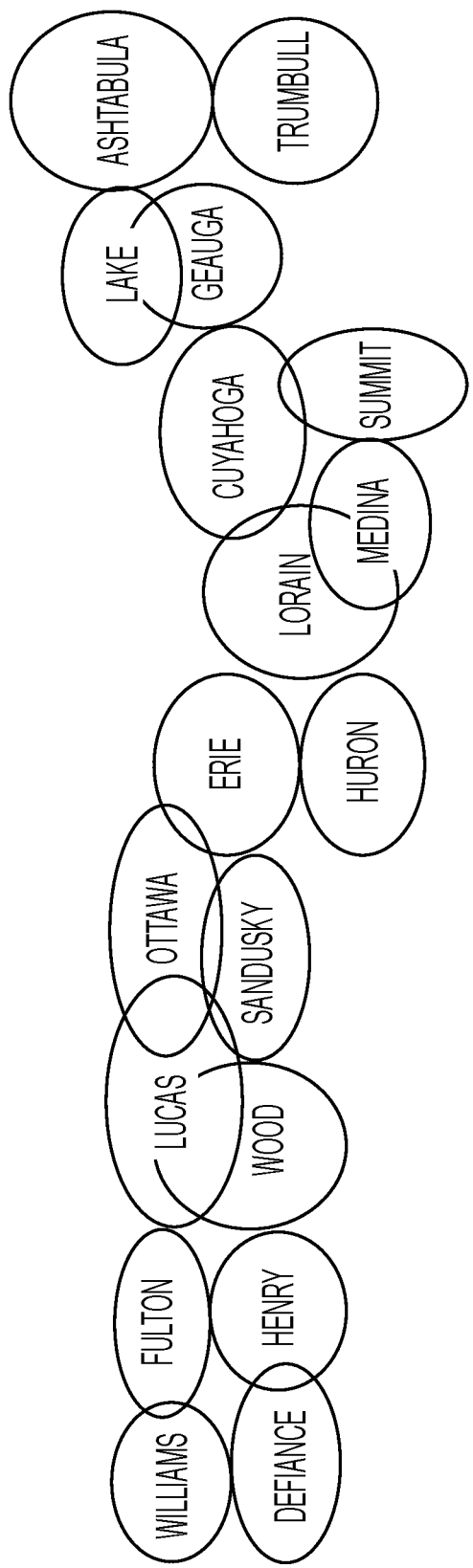
FIG. 10 provides an exemplary graphical representation of groups of anonymous address datapoints by presenting ellipses that represent a northern portion of counties in the state of Ohio.
Figure 11:
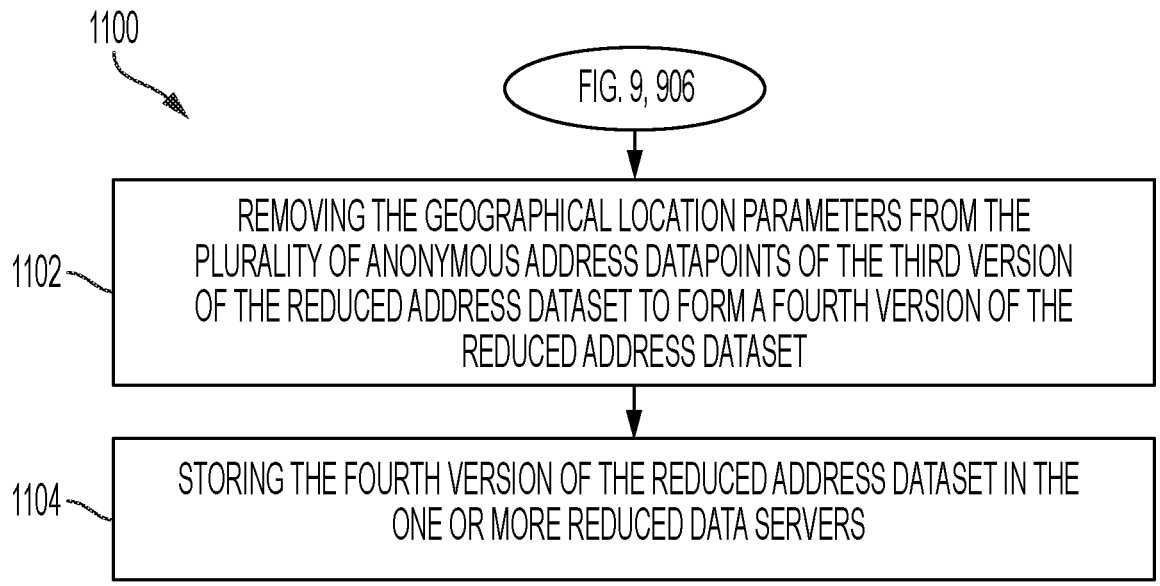
FIG. 11, in combination with FIGS. 3, 6, and 9, is a flow chart of yet another exemplary embodiment of a process for generating a reduced dataset for a geographical area.
Figure 12:
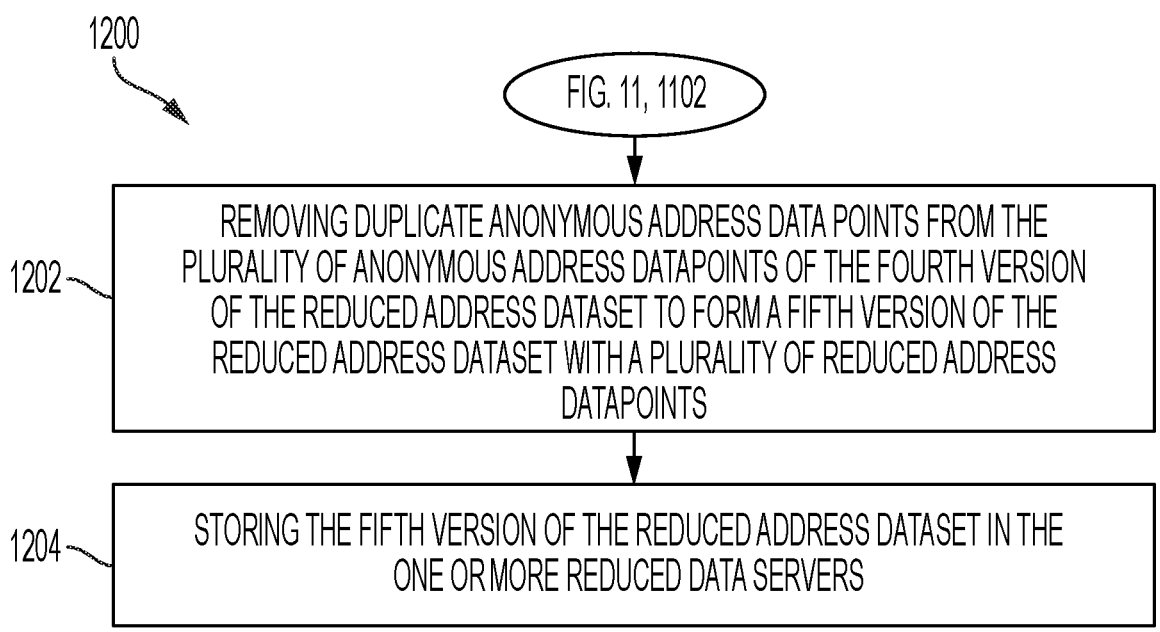
FIG. 12, in combination with FIGS. 3, 6, 9, and 11, is a flow chart of still another exemplary embodiment of a process for generating a reduced dataset for a geographical area.

With reference to FIG. 10, an exemplary graphical representation shows groups of anonymous address datapoints that are presented by ellipses representing a northern portion of counties in the state of Ohio. For example, there are 18 ellipses representing 18 Ohio counties (e.g., Defiance, Cuyahoga, Ashtabula, etc.). The location and shape of each ellipse is based on the geographical location metric values for each county group of anonymous address datapoints. For example, minimum and maximum latitude metrics and minimum and maximum longitude metrics for the Cuyahoga county group define the perimeter of the Cuyahoga county ellipse. Alternatively, the geographical location metrics for each county group of anonymous address datapoints could be used to define a polygon representing the corresponding county. The irregular boundaries of the Ohio counties result in overlapping county ellipses as well as gaps between ellipses. This occurs because use of the geographical location metrics smooths the irregular boundaries.

With reference to FIGS. 3, 6, 9, and 11, yet another exemplary embodiment of a process 1100 for generating a reduced address dataset for a geographical area includes the processes 300, 600, 900 of FIGS. 3, 6, and 9 and continues from 906 to 1102 where the geographical location parameters are removed from the plurality of anonymous address datapoints of the third version of the reduced address dataset to form a fourth version of the reduced address dataset. Each anonymous address datapoint of the fourth version of the reduced address dataset is represented by the anonymous address parameters, the first group identifier parameter, and the geographical location metric parameters. At 1104, the fourth version of the reduced address dataset is stored in the one or more reduced data servers. In another embodiment of the process 1100, the fourth version of the reduced address dataset is for use by the geographical analytics service provider in developing analytical tools for analyzing the target parameters in the target dataset.

With reference to FIGS. 3, 6, 9, 11, and 12, still another exemplary embodiment of a process 1200 for generating a reduced address dataset for a geographical area includes the processes 300, 600, 900, 1100 of FIGS. 3, 6, 9, and 11 and continues from 1102 to 1202 where duplicate anonymous address datapoints are removed from the plurality of anonymous address datapoints of the fourth version of the reduced address dataset to form a fifth version of the reduced address dataset with a plurality of anonymous address datapoints. The duplicate anonymous address datapoints have the same values for the anonymous address parameters, the first group identifier parameter, and the geographical location metric parameters. Each anonymous address datapoint of the fifth version of the reduced address dataset is represented by the anonymous address parameters, the first group identifier parameter, and the geographical location metric parameters. At 1204, the fifth version of the reduced address dataset is stored in the one or more reduced data servers. In another embodiment of the process 1200, the fifth version of the reduced address dataset is for use by a geographical analytics service provider as a reference address dataset in analyzing target parameters in a target dataset associated with one or more managed service providers to develop geographical distributions of the target parameters.

Figure 13:
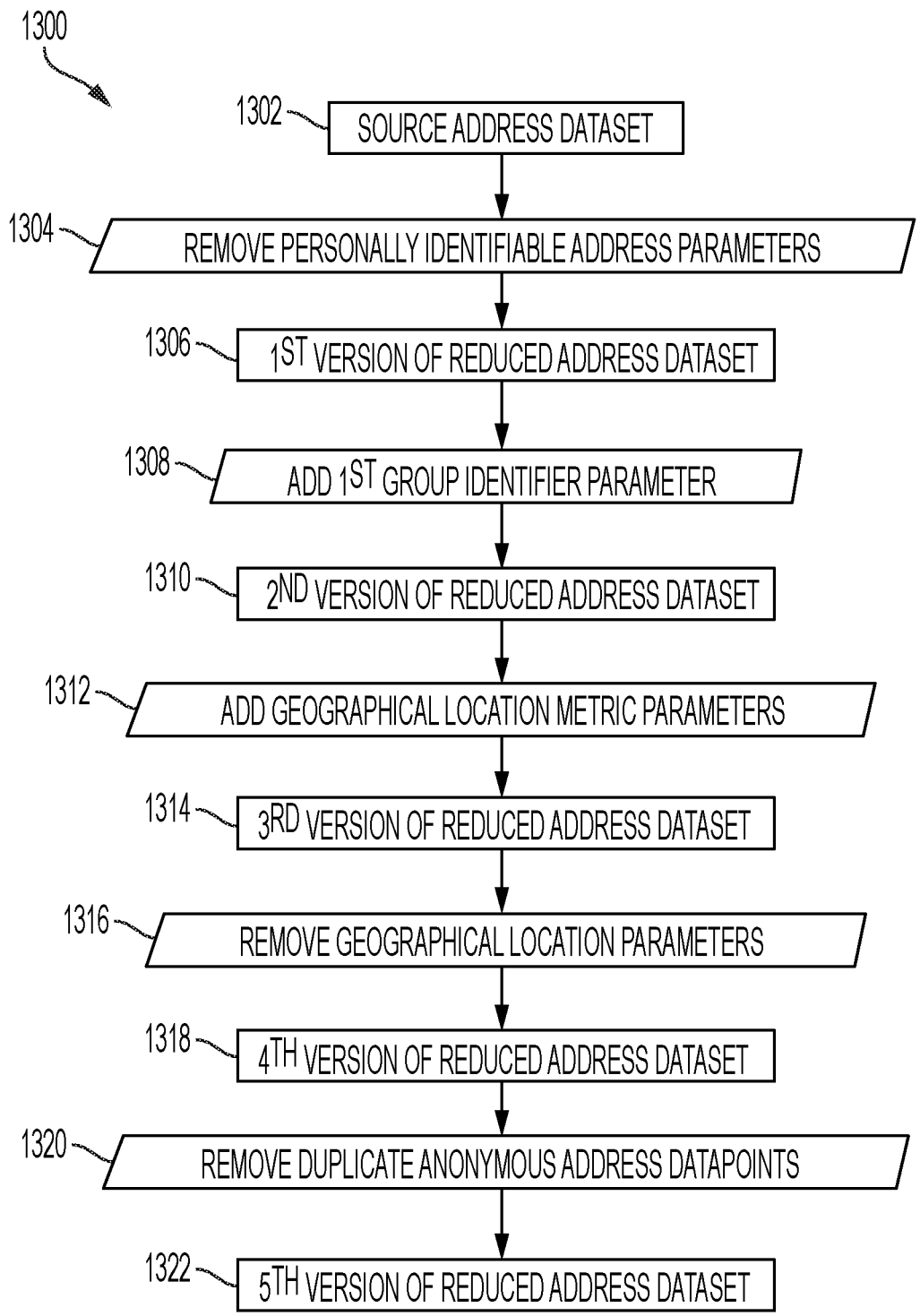
FIG. 13 is a functional diagram of another exemplary embodiment of a process for generating a reduced dataset for a geographical area.

With reference to FIG. 13, an exemplary embodiment of a process 1300 for generating a reduced address dataset for a geographical area begins at 1302 where a source address dataset is received at one or more reduced data servers of an analytic computer system from at least one source data server of a source computer system via a data communication network. At 1304, personally identifiable address parameters are removed from the source address dataset. This forms a first version of a reduced address dataset (1306). At 1308, a first group identifier parameter is added to the first version of the reduced address dataset. This forms a second version of the reduced address dataset (1310). At 1312, geographical location metric parameters are added to the second version of the reduced address dataset. This forms a third version of the reduced address dataset (1314). At 1316, geographical location parameters are removed from the third version of the reduced address dataset. This forms a fourth version of the reduced address dataset (1318). At 1320, duplicate anonymous address datapoints are removed from the fourth version of the reduced address dataset. This forms a fifth version of the reduced address dataset (1318).

Figure 14:
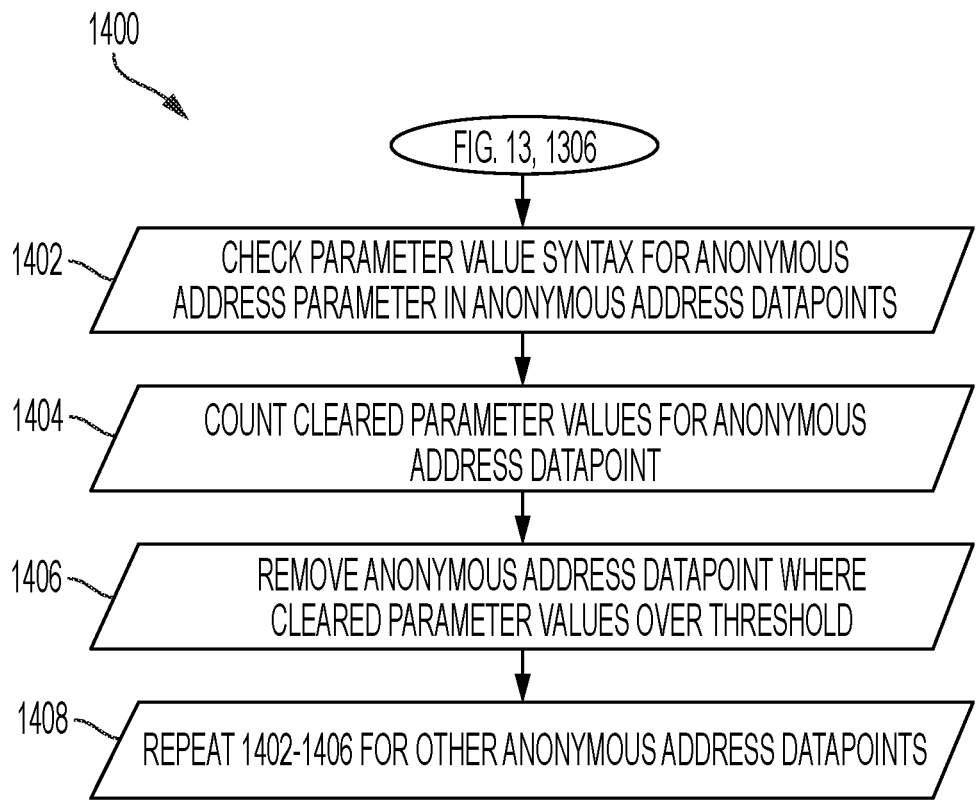
FIG. 14, in combination with FIG. 13, is a functional diagram of yet another exemplary embodiment of a process for generating a reduced dataset for a geographical area.

With reference to FIGS. 13 and 14, another exemplary embodiment of a process 1400 for generating a reduced address dataset for a geographical area includes the process 1300 of FIG. 13 and continues from 1306 to 1402 where parameter value syntax is checked for anonymous address parameters in anonymous address datapoints of the first version of the reduced address dataset. Parameter values that do not comply with the required syntax are cleared. At 1404, cleared parameter values are counted for a select anonymous address datapoint. At 1406, the select anonymous address datapoint is removed from the first version of the reduced address dataset of the amount of cleared parameter values is over a predetermined threshold. At 1408, the checking (1402), counting (1404), and removing (1406) are repeated for other anonymous address datapoints.

Figure 15:
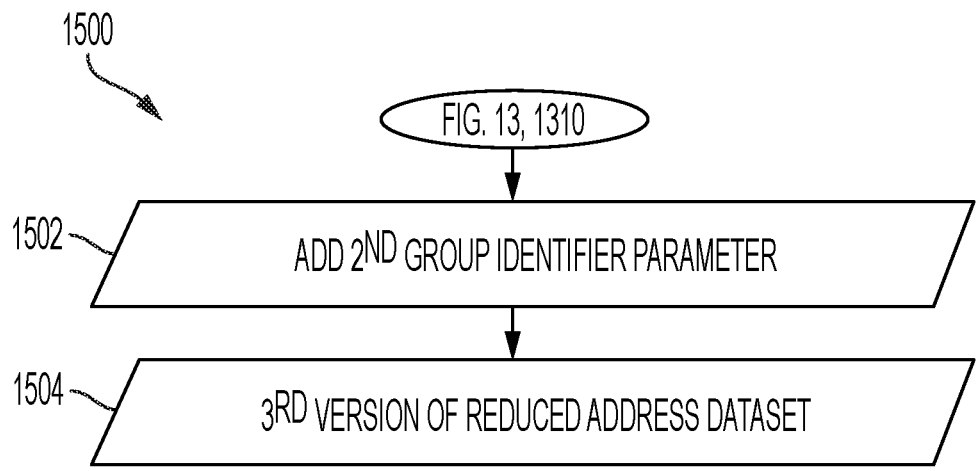
FIG. 15, in combination with FIG. 13, is a functional diagram of still another exemplary embodiment of a process for generating a reduced dataset for a geographical area.

With reference to FIGS. 13 and 15, yet another exemplary embodiment of a process 1500 for generating a reduced address dataset for a geographical area includes the process 1300 of FIG. 13 and continues from 1310 to 1502 where a second group identifier parameter is added to the second version of the reduced address dataset. This forms a third version of the reduced address dataset (1504).

Figure 16:
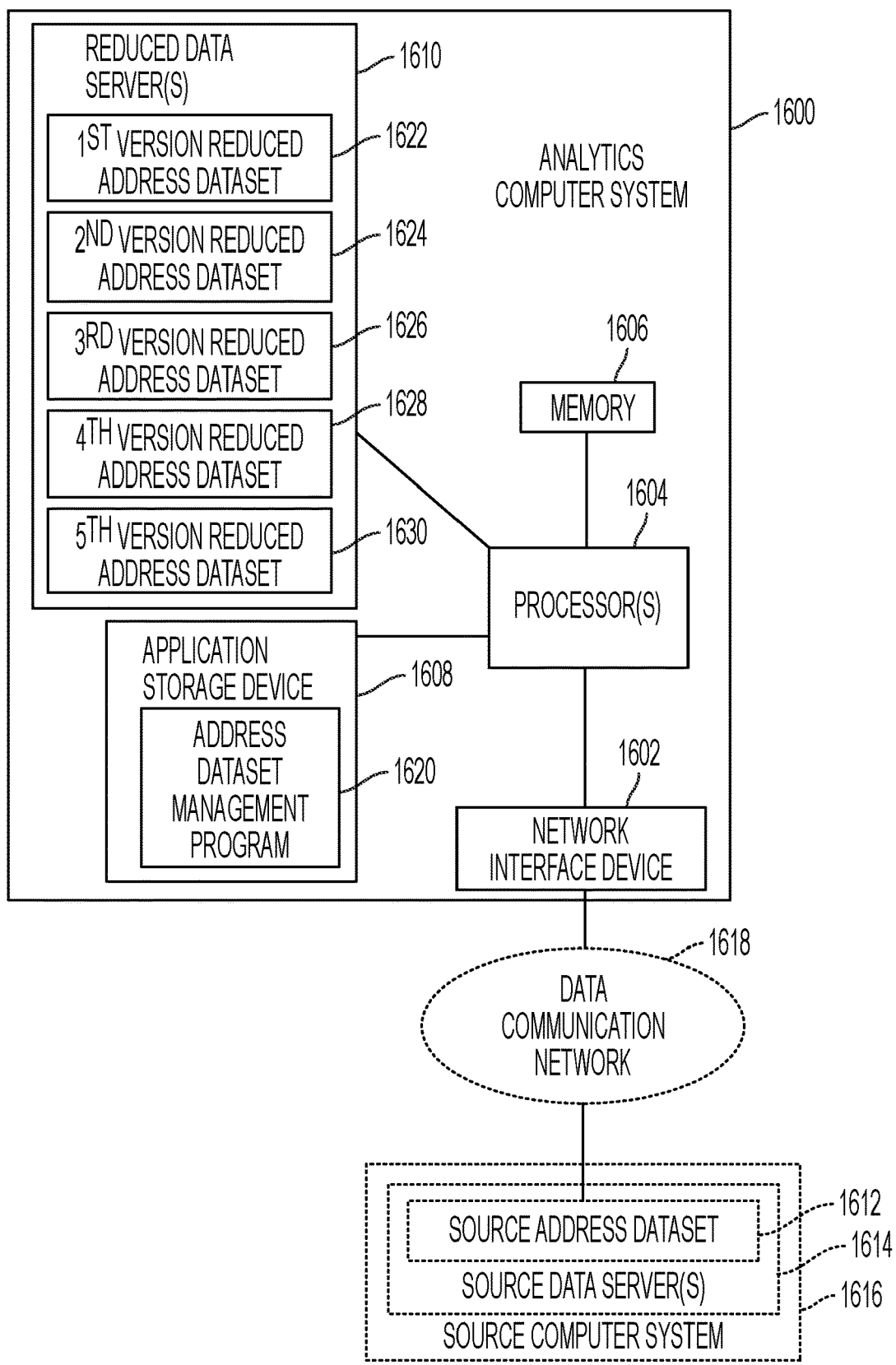
FIG. 16 is a block diagram of an exemplary embodiment of an analytics computer system for generating a reduced dataset for a geographical area.

With reference to FIG. 16, an exemplary of embodiment of an analytics computer system 1600 for generating a reduced dataset for a geographical area includes a network interface device 1602, at least one processor 1604 and associated memory 1606, at least one application storage device 1608, and one or more reduced data servers 1610, The network interface device 1602 configured to receive a source address dataset 1612 for a select geographical area from at least one source data server 1614 of a source computer system 1616 via a data communication network 1618, The source address dataset 1612 includes a plurality of source address datapoints. Each source address datapoint is represented by detailed address parameters and corresponding geographical location parameters. The detailed address parameters include personally identifiable address parameters and anonymous address parameters. The at least one application storage device 1608 configured to store an address dataset management program 1620. The at least one processor 1604 and associated memory 1604, in conjunction with execution of the address dataset management program 1620, are configured to remove the personally identifiable address parameters from the detailed address parameters of the plurality of source address datapoints to form a first version 1622 of the reduced address dataset with a plurality of anonymous address datapoints. Each anonymous address datapoint is represented by the anonymous address parameters and the geographical location parameters. The at least one processor 1604 and associated memory 1606, in conjunction with execution of the address dataset management program 1620, are configured to store the first version 1622 of the reduced address dataset in the one or more reduced data servers 1610. The analytics computer system 1600 and the reduced address dataset are for use by a geographical analytics service provider as a reference address dataset in analyzing target parameters in a target dataset associated with one or more managed service providers to develop geographical distributions of the target parameters.

In another embodiment, the analytics computer system 1600 is cloud-based. In yet another embodiment, the analytics computer system 1600 and the source computer system 1616 are co-located. In still another embodiment of the analytics computer system 1600, the source computer system 1616 is hosted remotely in relation to the analytics computer system 1600. In still yet another embodiment, the analytics computer system 1600 and the first version 1622 of the reduced address dataset are for use by the geographical analytics service provider in developing analytical tools for analyzing the target parameters in the target dataset.

In another embodiment of the analytics computer system 1600, the at least one processor 1604 and associated memory 1606, in conjunction with execution of the address dataset management program 1620, are configured to compare parameter values of a select anonymous address parameter from the plurality of anonymous address parameters for the plurality of anonymous address datapoints to a predetermined syntax for the select anonymous address parameter. In this embodiment, the at least one processor 1604 and associated memory 1606, in conjunction with execution of the address dataset management program 1620, are configured to clear the parameter value for the select anonymous address parameter in each anonymous address datapoint in which the parameter value is not in compliance with the predetermined syntax. In a further embodiment, the at least one processor 1604 and associated memory 1606, in conjunction with execution of the address dataset management program 1620, are configured to repeat the comparing and clearing for additional anonymous address parameters from the plurality of anonymous address parameters in the plurality of anonymous address datapoints. The comparing for additional anonymous address parameters is to predetermined syntaxes for the corresponding anonymous address parameters. In an even further embodiment, the at least one processor 1604 and associated memory 1606, in conjunction with execution of the address dataset management program 1620, are configured to count the amount of cleared parameter values for the plurality of anonymous address parameters for a select anonymous address datapoint of the plurality of anonymous address datapoints. In this embodiment, the at least one processor 1604 and associated memory 1606, in conjunction with execution of the address dataset management program 1620, are configured to remove the select anonymous address datapoint from the first version 1622 of the reduced address dataset where the amount of cleared parameter values exceeds a predetermined threshold. The at least one processor 1604 and associated memory 1606, in conjunction with execution of the address dataset management program 1620, are configured to repeat the counting and removing for additional anonymous address datapoints of the plurality of anonymous address datapoints.

In yet another embodiment of the analytics computer system 1600, the at least one processor 1604 and associated memory 1606, in conjunction with execution of the address dataset management program 1620, are configured to identify a first select combination of one or more anonymous address parameters from the plurality of anonymous address parameters. In this embodiment, the at least one processor 1604 and associated memory 1606, in conjunction with execution of the address dataset management program 1620, are configured to divide the plurality of anonymous address datapoints of the first version of the reduced address dataset into a first plurality of groups by matching values for the one or more anonymous address parameters associated with the first select combination. The at least one processor 1604 and associated memory 1606, in conjunction with execution of the address dataset management program 1620, are configured to add a first group identifier parameter to the plurality of anonymous address datapoints of the first version 1622 of the reduced address dataset to form a second version 1624 of the reduced address dataset. Each anonymous address datapoint of the second version 1624 of the reduced address dataset is represented by the anonymous address parameters, the first group identifier parameter, and the geographical location parameters. The at least one processor 1604 and associated memory 1606, in conjunction with execution of the address dataset management program 1620, are configured to assign a group identifier to each of the first plurality of groups and to set a value for the first group identifier parameter in each of the plurality of anonymous address datapoints to the group identifier with which the corresponding anonymous address datapoint is associated. The at least one processor 1604 and associated memory 1606, in conjunction with execution of the address dataset management program 1620, are configured to store the second version 1624 of the reduced address dataset in the one or more reduced data servers 1610.

In yet another further embodiment, the analytics computer system 1600 and the second version 1624 of the reduced address dataset are for use by the geographical analytics service provider in developing analytical tools for analyzing the target parameters in the target dataset.

In still another embodiment of the analytics computer system 1600, the at least one processor 1604 and associated memory 1606, in conjunction with execution of the address dataset management program 1620, are configured to identify a second select combination of one or more anonymous address parameters from the plurality of anonymous address parameters. The second select combination is different from the first select combination. In this embodiment, the at least one processor 1604 and associated memory 1606, in conjunction with execution of the address dataset management program 1620, are configured to divide the plurality of anonymous address datapoints of the second version 1624 of the reduced address dataset into a second plurality of groups by matching values for the one or more anonymous address parameters associated with the second select combination. The at least one processor 1604 and associated memory 1606, in conjunction with execution of the address dataset management program 1620, are configured to add a second group identifier parameter to the plurality of anonymous address datapoints of the second version of the reduced address dataset to form a third version 1626 of the reduced address dataset. Each anonymous address datapoint of the third version 1626 of the reduced address dataset is represented by the anonymous address parameters, the first group identifier parameter, the second group identifier parameter, and the geographical location parameters. The at least one processor 1604 and associated memory 1606, in conjunction with execution of the address dataset management program 1620, are configured to assign a second group identifier to each of the second plurality of groups and to set a value for the second group identifier parameter in each of the plurality of anonymous address datapoints to the second group identifier with which the corresponding anonymous address datapoint is associated. The at least one processor 1604 and associated memory 1606, in conjunction with execution of the address dataset management program 1620, are configured to store the third version 1626 of the reduced address dataset in the one or more reduced data servers 1610. In a further embodiment of the analytics computer system 1600, the at least one processor 1604 and associated memory 1606, in conjunction with execution of the address dataset management program 1620, are configured to remove the first group identifier parameter from the third version 1626 of the reduced address dataset. In this embodiment, each anonymous address datapoint of the third version 1626 of the reduced address dataset is represented by the anonymous address parameters, the second group identifier parameter, and the geographical location parameters.

In still yet another embodiment of the analytics computer system 1600, the at least one processor 1604 and associated memory 1606, in conjunction with execution of the address dataset management program 1620, are configured to process each group of anonymous address datapoints based on the geographical location parameters of the anonymous address datapoints associated with the corresponding group to generate geographical location metrics for each group of the first plurality of groups. In this embodiment, the at least one processor 1604 and associated memory 1606, in conjunction with execution of the address dataset management program 1620, are configured to add geographical location metric parameters to the plurality of anonymous address datapoints of the second version 1624 of the reduced address dataset to form a third version 1626 of the reduced address dataset. The geographical location metric parameters correspond to the generated geographical location metrics. Each anonymous address datapoint of the third version 1624 of the reduced address dataset is represented by the anonymous address parameters, the first group identifier parameter, the geographical location parameters, and the geographical location metric parameters. The at least one processor 1604 and associated memory 1606, in conjunction with execution of the address dataset management program 1620, are configured to set values for the geographical location metric parameters in each of the plurality of anonymous address datapoints to the corresponding geographical location metrics generated for the corresponding anonymous address datapoint. The at least one processor 1604 and associated memory 1606, in conjunction with execution of the address dataset management program 1620, are configured to store the third version 1626 of the reduced address dataset in the one or more reduced data servers 1610. In a further embodiment, the analytics computer system 1600 and the third version 1626 of the reduced address dataset are for use by the geographical analytics service provider in developing analytical tools for analyzing the target parameters in the target dataset.

In another embodiment of the analytics computer system 1600, the at least one processor 1604 and associated memory 1606, in conjunction with execution of the address dataset management program 1620, are configured to remove the geographical location parameters from the plurality of anonymous address datapoints of the third version 1626 of the reduced address dataset to form a fourth version 1628 of the reduced address dataset. Each anonymous address datapoint of the fourth version 1628 of the reduced address dataset is represented by the anonymous address parameters, the first group identifier parameter, and the geographical location metric parameters. In this embodiment, the at least one processor 1604 and associated memory 1606, in conjunction with execution of the address dataset management program 1620, are configured to store the fourth version 1628 of the reduced address dataset in the one or more reduced data servers 1610. In a further embodiment, the analytics computer system 1600 and the fourth version 1628 of the reduced address dataset are for use by the geographical analytics service provider in developing analytical tools for analyzing the target parameters in the target dataset.

In yet another embodiment of the analytics computer system 1600, the at least one processor 1604 and associated memory 1606, in conjunction with execution of the address dataset management program 1620, are configured to remove duplicate anonymous address datapoints from the plurality of anonymous address datapoints of the fourth version 1628 of the reduced address dataset to form a fifth version 1630 of the reduced address dataset with a plurality of anonymous address datapoints. The duplicate anonymous address datapoints have the same values for the anonymous address parameters, the first group identifier parameter, and the geographical location metric parameters. Each anonymous address datapoint of the fifth version 1630 of the reduced address dataset is represented by the anonymous address parameters, the first group identifier parameter, and the geographical location metric parameters. In this embodiment, the at least one processor 1604 and associated memory 1606, in conjunction with execution of the address dataset management program 1620, are configured to store the fifth version 1630 of the reduced address dataset in the one or more reduced data servers 1610. In a further embodiment, the analytics computer system 1600 and the fifth version 1630 of the reduced address dataset are for use by the geographical analytics service provider as a reference address dataset in analyzing the target parameters in the target dataset.

Figure 17:
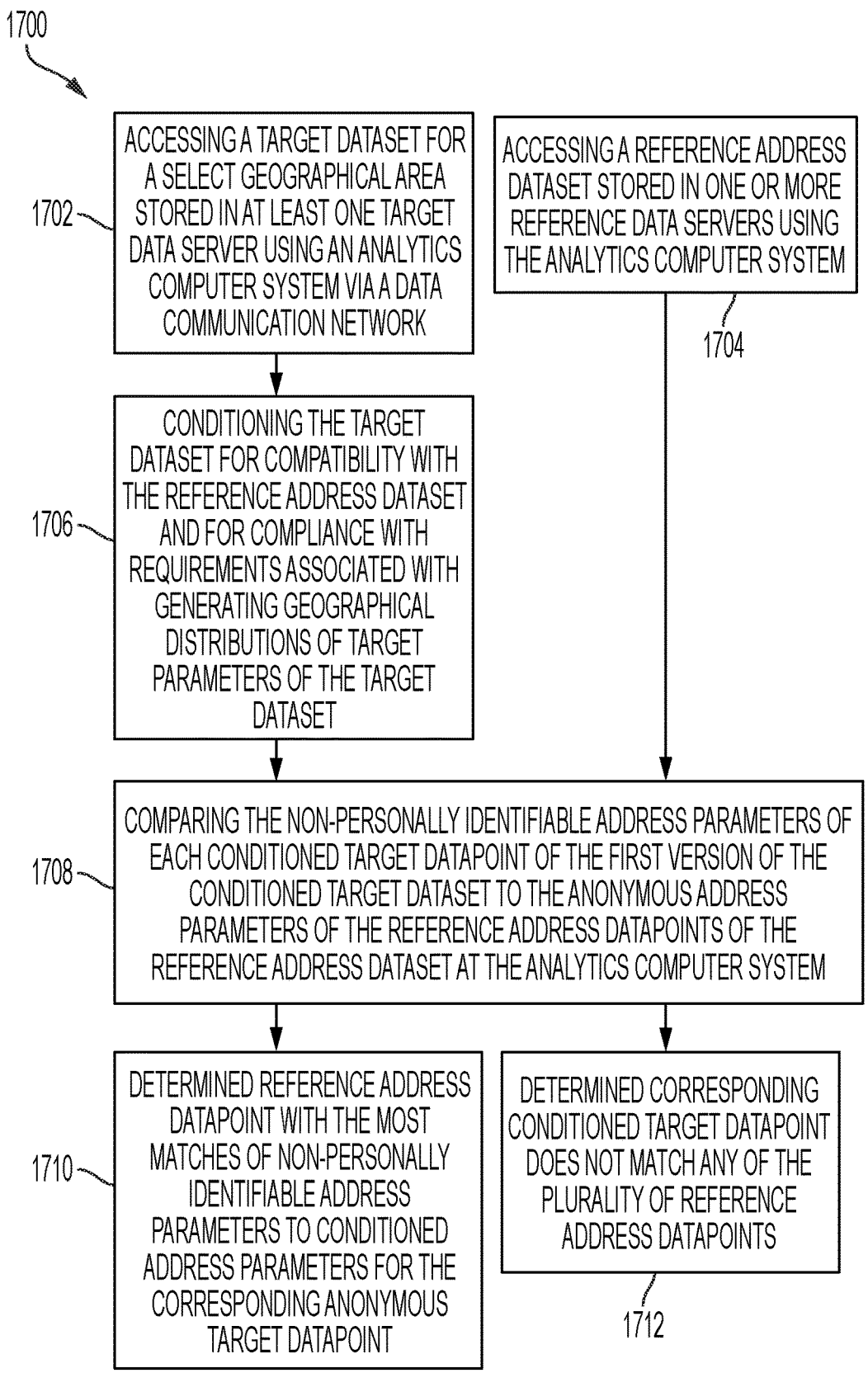
FIG. 17 is a flow chart of an exemplary embodiment of a process for generating a geographical distribution of a target parameter of a target dataset.

With reference to FIG. 17, an exemplary embodiment of a process 1700 for generating a geographical distribution of a target parameter of a target dataset begins at 1702 where a target dataset for a select geographical area stored in at least one target data server is accessed using an analytics computer system via a data communication network. The target dataset includes a plurality of target datapoints. Each target datapoint is represented by at least one target parameter and corresponding reported address parameters. The reported address parameters include personally identifiable address parameters and non-personally identifiable address parameters. At 1704, a reference address dataset stored in one or more reference data servers is accessed using the analytics computer system. The reference address dataset includes a plurality of reference address datapoints. Each reference address datapoint is represented by anonymous address parameters, at least one group identifier parameter, and geographical location metric parameters associated with each group identifier parameter. Each group identifier parameter is associated with a different division of the plurality of reference address datapoints into a plurality of groups by matching values of a select combination of one or more anonymous address parameters from the plurality of anonymous address parameters. At 1706, the target dataset is conditioned for compatibility with the reference address dataset and for compliance with requirements associated with generating geographical distributions of target parameters of the target dataset. The conditioning is performed at the analytics computer system to form a first version of a conditioned target dataset with a plurality of conditioned target datapoints. Each conditioned target datapoint is represented by at least the at least one target parameter and the non-personally identifiable address parameters. At 1708, the non-personally identifiable address parameters of each conditioned target datapoint of the first version of the conditioned target dataset are compared to the anonymous address parameters of the reference address datapoints of the reference address dataset at the analytics computer system to determine at least one reference address datapoint with the most matches of non-personally identifiable address parameters to anonymous address parameters for the corresponding conditioned target datapoint (1710) or to determine the corresponding conditioned target datapoint does not match any of the plurality of reference address datapoints (1712). The conditioned target dataset is for use by a geographical analytics service provider in analyzing the at least one target parameter which is associated with one or more managed service providers to develop geographical distributions of the at least one target parameter.

In another embodiment of the process 1700, the select geographical area includes one of our planet, a hemisphere, one or more continent, one or more country, one or more regional area, one or more state, and any other suitable geographical area. In yet another embodiment of the process 1700, the target dataset includes a plurality of target datasets associated with a corresponding plurality of managed service providers.

In still another embodiment of the process 1700, the at least one target parameter includes any combination of a monthly recurring revenue, expenses, adaption metrics, utilization metrics, server statistics, end client details, down time, up time, and any other suitable target parameter. In still yet another embodiment of the process 1700, the reported address parameters include any combination of a personal name, an entity name, a street address, a city, a state, a postal code, a country, a borough, a regional area, a county, a township, and other suitable reported address parameter.

In another embodiment of the process 1700, the personally identifiable address parameters include any combination of a personal name, an entity name, a street address, and any other suitable personally identifiable address parameter. In yet another embodiment of the process 1700, the non-personally identifiable address parameters include any combination of a city, a state, a postal code, a country, a borough, a regional area, a county, a township, and any other suitable non-personally identifiable address parameter. In still another embodiment of the process 1700, the anonymous address parameters include any combination of a city, a state, a postal code, a country, a borough, a regional area, a county, a township, and any other anonymous address parameter.

In still yet another embodiment of the process 1700, the geographical location metrics associated with each group identifier parameter include any combination of a maximum longitude, a minimum longitude, an average longitude, a median longitude, a longitude mode, a longitude standard deviation, and any other suitable geographical location metric. In another embodiment of the process 1700, the geographical location metrics associated with each group identifier parameter include any combination of a maximum latitude, a minimum latitude, an average latitude, a median latitude, a latitude mode, a latitude standard deviation, and any other suitable geographical location metric. In yet another embodiment of the process 1700, the geographical location metrics associated with each group identifier parameter include any combination of a maximum elevation, a minimum elevation, an average elevation, a median elevation, an elevation mode, an elevation standard deviation, and any other suitable geographical location metric.

In still another embodiment of the process 1700, the first version of the conditioned target dataset is for use by the geographical analytics service provider in analyzing the at least one target parameter to develop the geographical distributions. In still yet another embodiment, the process 1700 also includes storing the first version of the conditioned target dataset in the one or more reference data servers.

Figure 18:
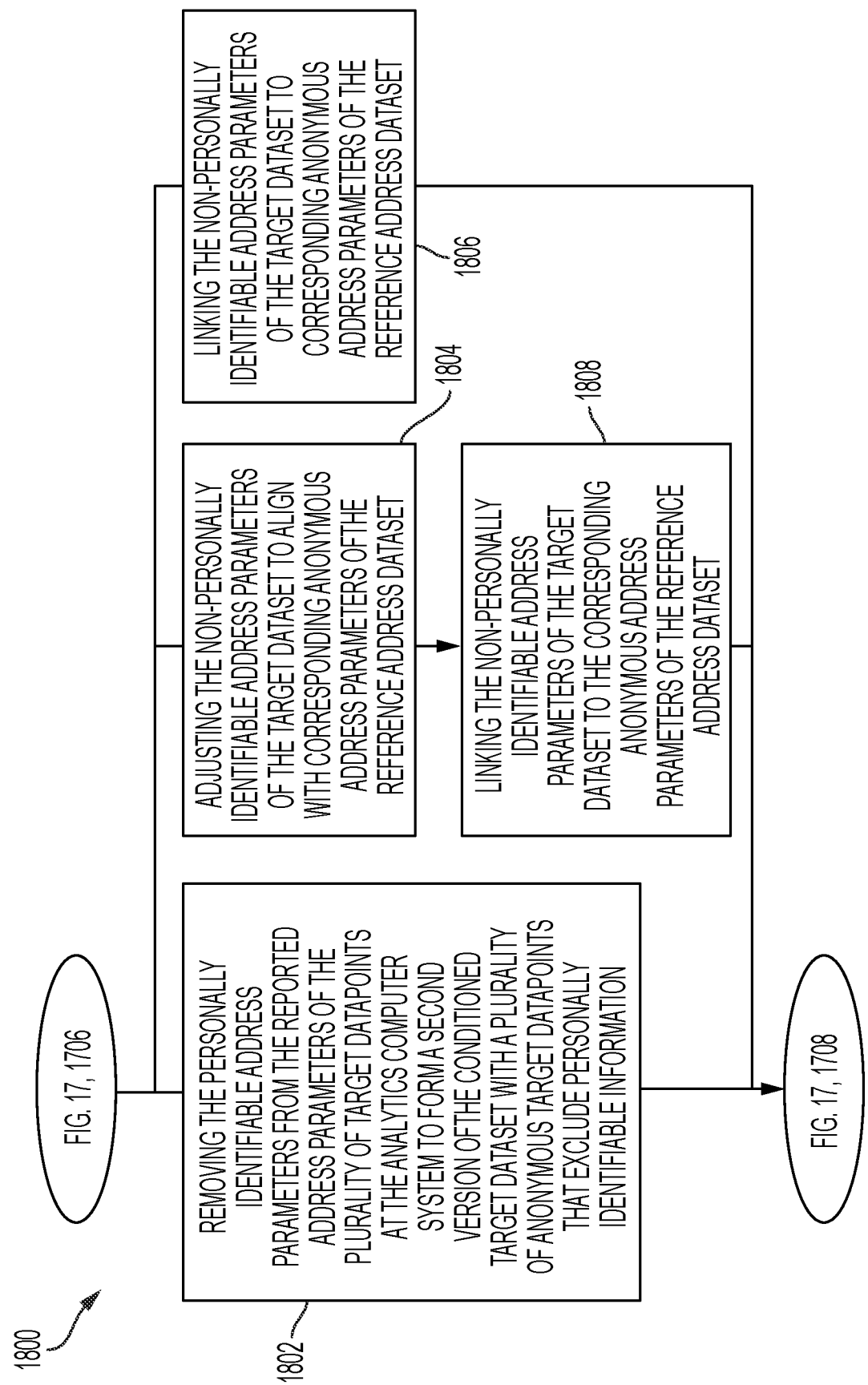
FIG. 18, in combination with FIG. 17, is a flow chart of another exemplary embodiment of a process for generating a geographical distribution of a target parameter of a target dataset.

With reference to FIGS. 17 and 18, another exemplary embodiment of a process 1800 for generating a geographical distribution of a target parameter of a target dataset includes the process 1700 of FIG. 17 and continues from 1706 to 1802, 1804, or 1806. The process 1800 may continue to both 1802 and 1804 in any order or to both 1802 and 1806 in any order. If the process 1800 continues to 1802, the conditioning of the target dataset (1706) includes removing the personally identifiable address parameters from the reported address parameters of the plurality of target datapoints at the analytics computer system to form the first version of the conditioned target dataset with a plurality of anonymous target datapoints that exclude personally identifiable information. Each anonymous target datapoint is represented by the at least one target parameter and the non-personally identifiable address parameters.

If the process 1800 continues to 1804, the conditioning of the target dataset (1706) includes adjusting the non-personally identifiable address parameters of the target dataset to align with corresponding anonymous address parameters of the reference address dataset. At 1808, the non-personally identifiable address parameters of the target dataset are linked to the corresponding anonymous address parameters of the reference address dataset. If the process 1800 continues to 1806, the conditioning of the target dataset (1706) includes linking the non-personally identifiable address parameters of the target dataset to corresponding anonymous address parameters of the reference address dataset.

Figure 19:
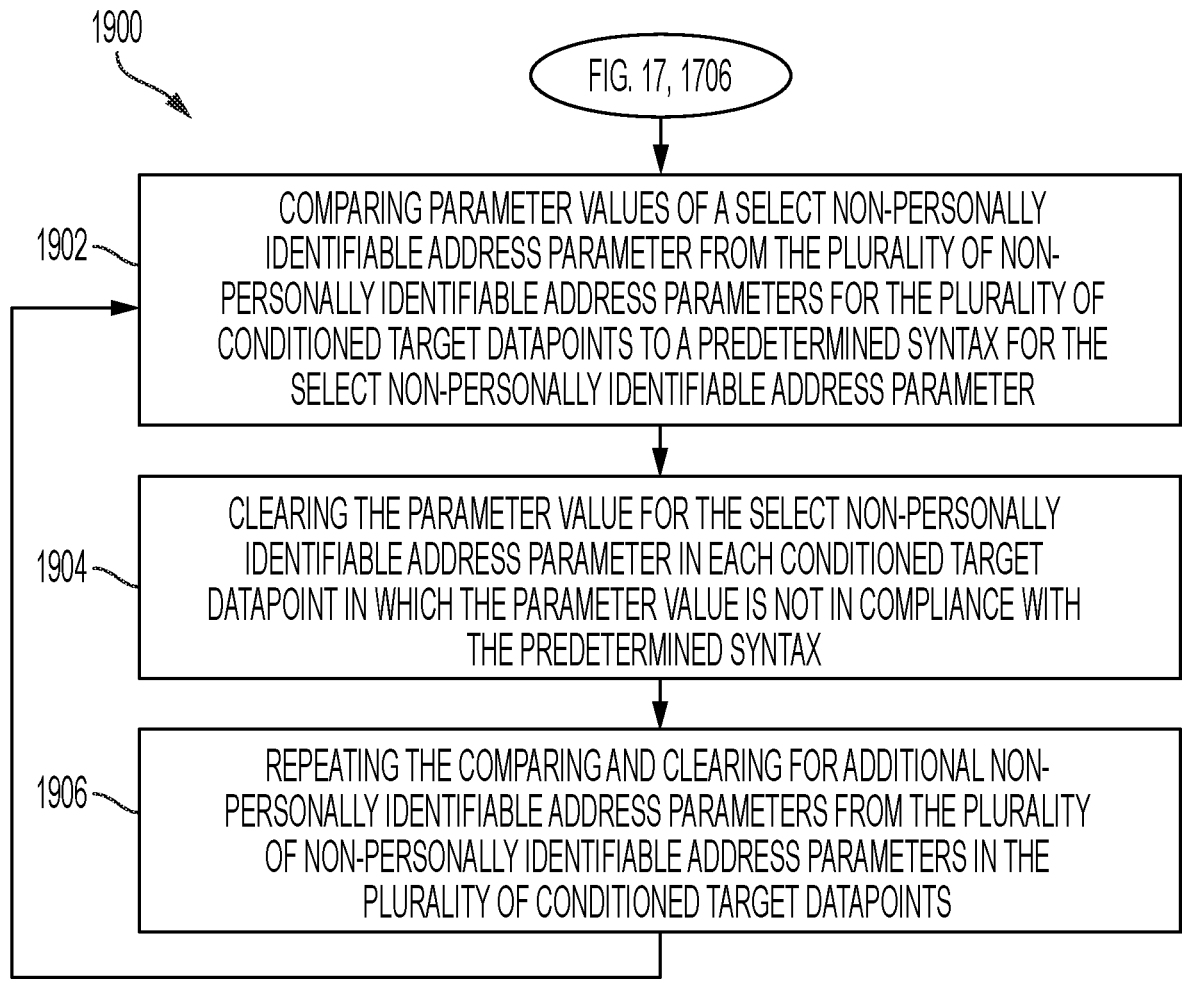
FIG. 19, in combination with FIG. 17, is a flow chart of yet another exemplary embodiment of a process for generating a geographical distribution of a target parameter of a target dataset.

With reference to FIGS. 17 and 19, yet another exemplary embodiment of a process 1900 for generating a geographical distribution of a target parameter of a target dataset includes the process 1700 of FIG. 17 and continues from 1706 to 1902 where the conditioning of the target dataset (1706) includes comparing parameter values of a select non-personally identifiable address parameter from the plurality of non-personally identifiable address parameters for the plurality of conditioned target datapoints to a predetermined syntax for the select non-personally identifiable address parameter. At 1904, the parameter value is cleared for the select non-personally identifiable address parameter in each conditioned target datapoint in which the parameter value is not in compliance with the predetermined syntax. Optionally, the process 1900 continues to 1906 where the comparing (1902) and clearing (1904) are repeated for additional non-personally identifiable address parameters from the plurality of non-personally identifiable address parameters in the plurality of conditioned target datapoints. The comparing for additional non-personally identifiable address parameters is to predetermined syntaxes for the corresponding non-personally identifiable address parameters.

Figure 20:
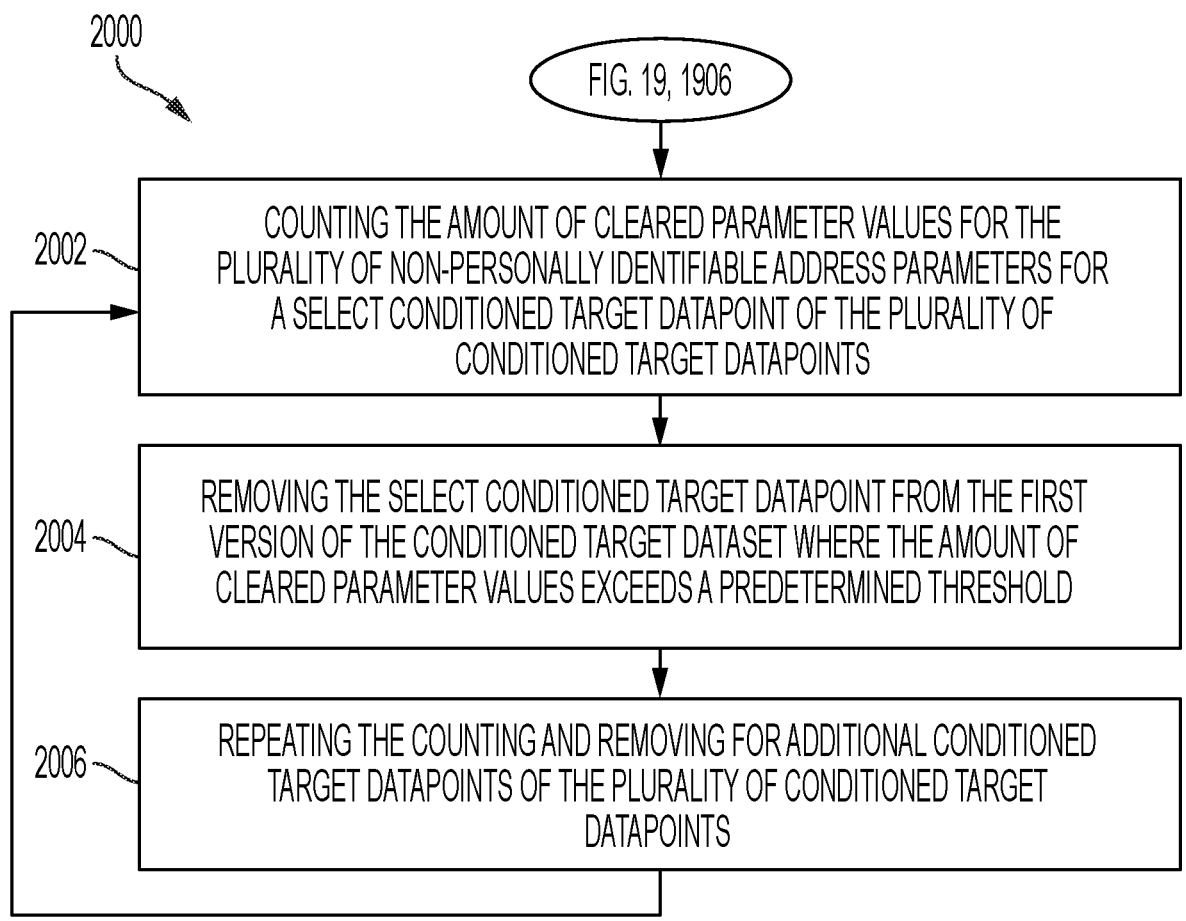
FIG. 20, in combination with FIGS. 17 and 19, is a flow chart of still another exemplary embodiment of a process for generating a geographical distribution of a target parameter of a target dataset.

With reference to FIGS. 17, 19, and 20, still another exemplary embodiment of a process 2000 for generating a geographical distribution of a target parameter of a target dataset includes the processes 1700, 1900 of FIGS. 17 and 19 and continues from 1906 to 2002 where the conditioning of the target dataset (1706) includes counting the amount of cleared parameter values for the plurality of non-personally identifiable address parameters for a select conditioned target datapoint of the plurality of conditioned target datapoints. At 2004, the select conditioned target datapoint is removed from the first version of the conditioned target dataset where the amount of cleared parameter values exceeds a predetermined threshold. At 2006, the counting (2002) and removing (2004) are repeated for additional conditioned target datapoints of the plurality of conditioned target datapoints.

Figure 21:
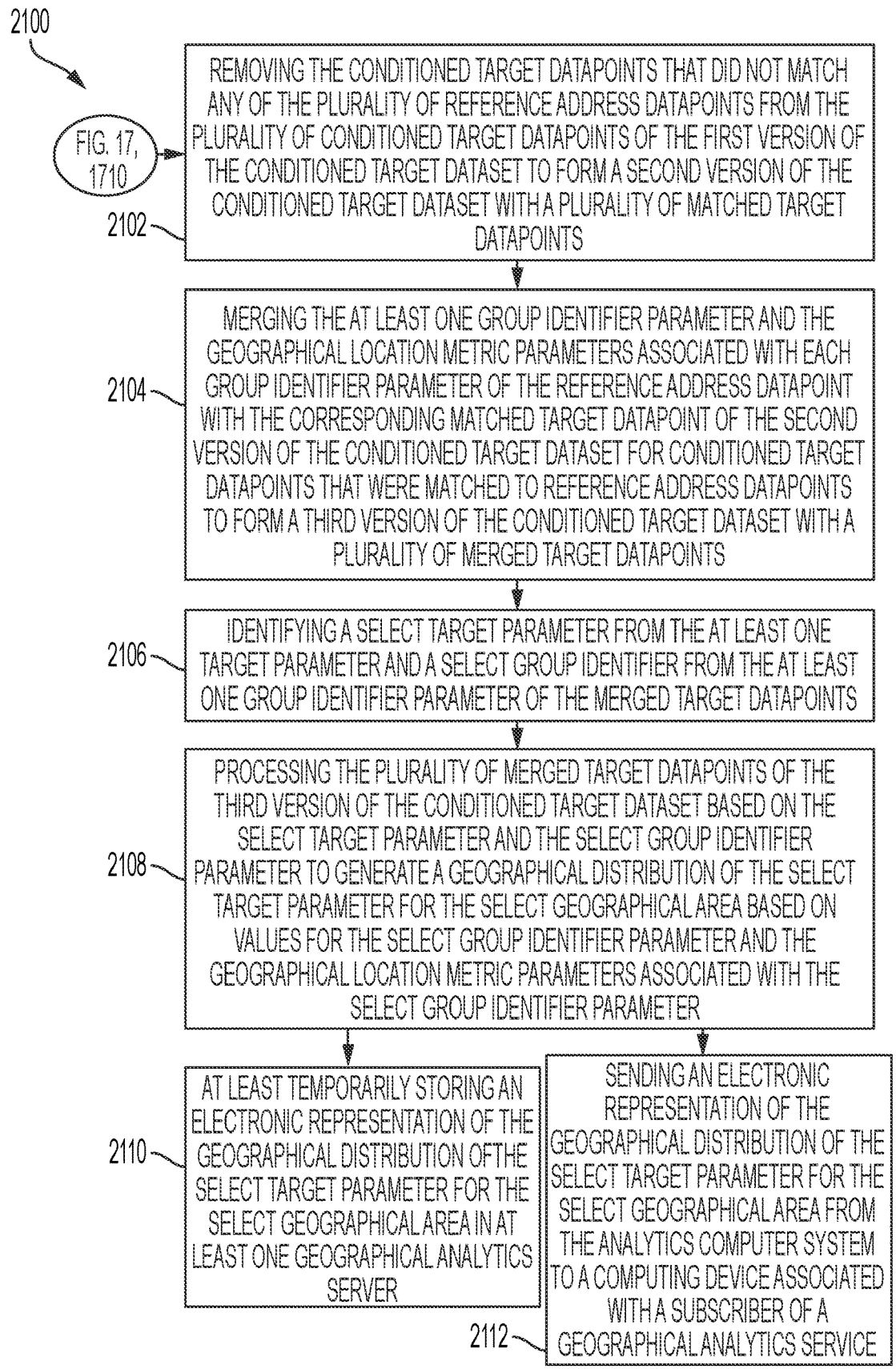
FIG. 21, in combination with FIG. 17, is a flow chart of still yet another exemplary embodiment of a process for generating a geographical distribution of a target parameter of a target dataset.

With reference to FIGS. 17 and 21, still another exemplary embodiment of a process 2100 for generating a geographical distribution of a target parameter of a target dataset includes the process 1700 of FIG. 17 and continues from 1710 to 2102 where the conditioned target datapoints that did not match any of the plurality of reference address datapoints are removed from the plurality of conditioned target datapoints of the first version of the conditioned target dataset to form a second version of the conditioned target dataset with a plurality of matched target datapoints. Each matched target datapoint is represented by the at least one target parameter and the non-personally identifiable address parameters. At 2104, the at least one group identifier parameter and the geographical location metric parameters associated with each group identifier parameter of the reference address datapoint are merged with the corresponding matched target datapoint of the second version of the conditioned target dataset for conditioned target datapoints that were matched to reference address datapoints to form a third version of the conditioned target dataset with a plurality of merged target datapoints. Each merged target datapoint is represented by the at least one target parameter, the non-personally identifiable address parameters, the at least one group identifier parameter, and the geographical location metric parameters associated with each group identifier parameter. At 2106, a select target parameter is identified from the at least one target parameter and a select group identifier is identified from the at least one group identifier parameter of the merged target datapoints. At 2108, the plurality of merged target datapoints of the third version of the conditioned target dataset are processed based on the select target parameter and the select group identifier parameter to generate a geographical distribution of the select target parameter for the select geographical area based on values for the select group identifier parameter and the geographical location metric parameters associated with the select group identifier parameter.

In another embodiment, the process 2100 also includes at least temporarily storing an electronic representation of the geographical distribution of the select target parameter for the select geographical area in at least one geographical analytics server (2110). In yet another embodiment, the process 2100 also includes sending an electronic representation of the geographical distribution of the select target parameter for the select geographical area from the analytics computer system to a computing device associated with a subscriber of a geographical analytics service (2112).

In still another embodiment of the process 2100, the select group identifier parameter represents the plurality of anonymous address parameters associated with the reference address dataset. In still yet another embodiment, the process 2100 also includes storing the second version of the conditioned target dataset in the one or more reference data servers. In another embodiment of the process 2100, the second version of the conditioned target dataset is for use by the geographical analytics service provider in analyzing the at least one target parameter to develop the geographical distributions. In yet another embodiment, the process 2100 also includes storing the third version of the conditioned target dataset in the one or more reference data servers. In still another embodiment of the process 2100, the third version of the conditioned target dataset is for use by the geographical analytics service provider in analyzing the at least one target parameter to develop the geographical distributions.

Figure 22:
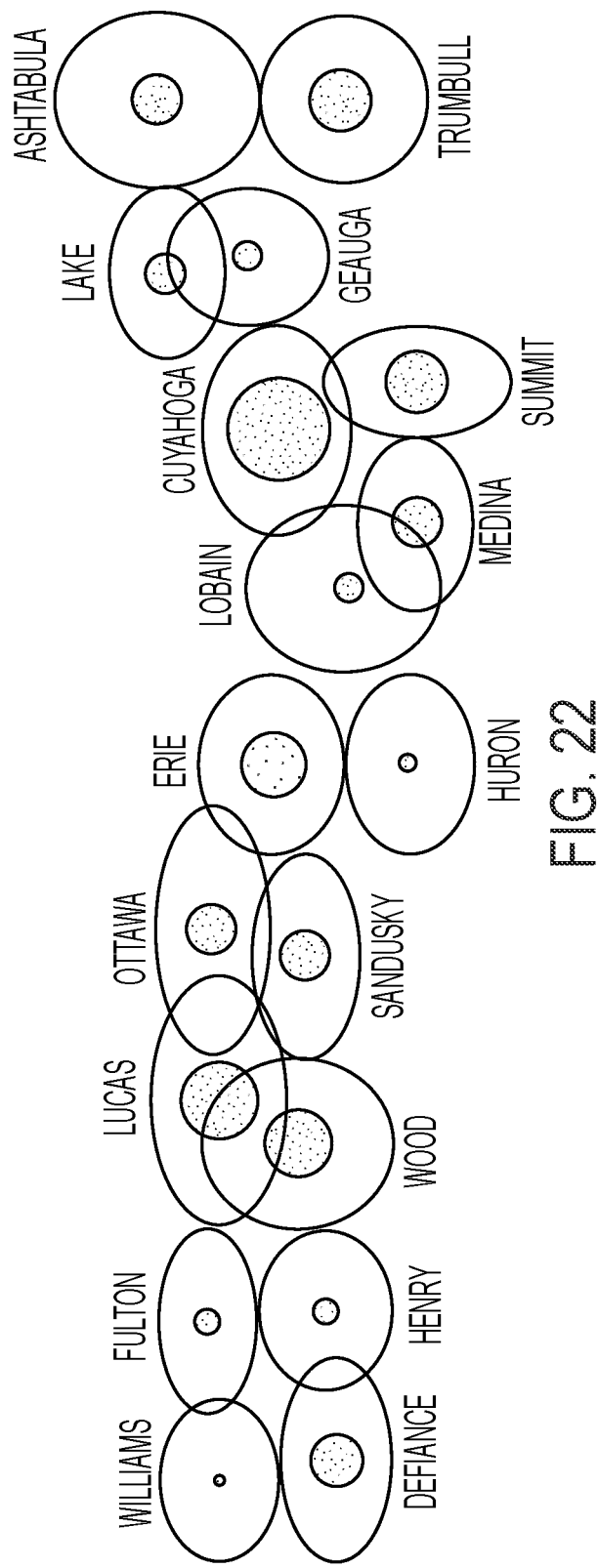
FIG. 22 provides an exemplary graphical representation of a target parameter of conditioned target datapoints by presenting circles that represent a quantifiable characteristic of the target parameter within the ellipses of FIG. 10.

With reference to FIG. 22, an exemplary graphic representation shows a select target parameter from the conditioned target dataset merged with address parameter groups of ellipses representing a northern portion of counties in the state of Ohio. In this example, the address parameter group is country-state-county. For example, there are 18 ellipses representing 18 Ohio counties (e.g., Defiance, Cuyahoga, Ashtabula, etc.), The select target parameter is presented as a circle within a central portion of the corresponding county. The size of the circle within each county is based on a quantifiable characteristic of the target parameter. In other words, larger circles reflect a larger amount and smaller circles reflect a smaller amount. The location and shape of each ellipse is based on the geographical location metric values for each county group of anonymous address datapoints. Thus, the location of the circle within each county is also based on the geographical location metric values for each county group of anonymous address datapoints. Alternatively, the target parameter could be represented using any suitable shape that can be varied in size based on the quantifiable characteristic. The target parameter could also be represented by a character or symbol that can be repeated to reflect increased quantities.

Figure 23:
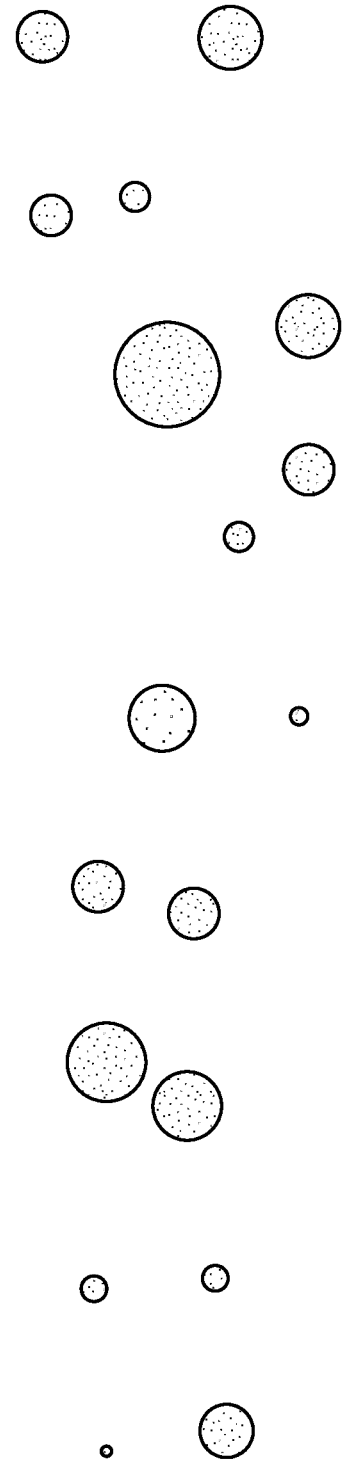
FIG. 23 provides an exemplary graphical representation of the target parameter of FIG. 22 without the ellipses of FIG. 22.

With reference to FIG. 23, an exemplary graphic representation shows the select target parameter of FIG. 22 without the ellipses of FIG. 22. The locations of the circles are based on the geographical location metric values for each address parameter group of anonymous address datapoints with which the quantifiable characteristics of the target parameter is associated. The size of the circle is based on the quantifiable characteristic of the target parameter within the corresponding address parameter group.

Figure 24:
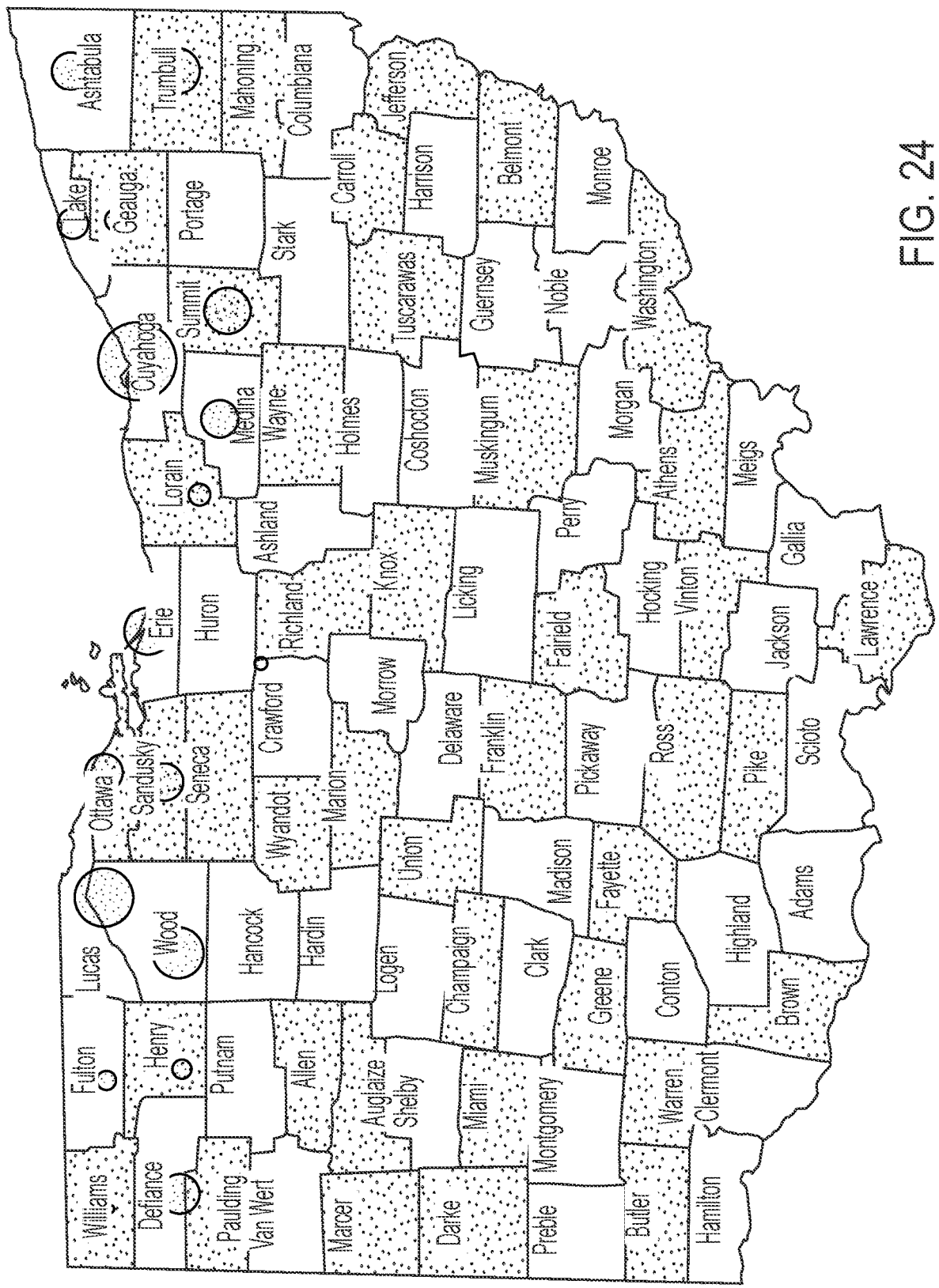
FIG. 24 provides an exemplary graphical representation of the target parameter of FIG. 22 overlaid on the map of the state of Ohio of FIG. 7.

With reference to FIG. 24, an exemplary graphic representation shows the select target parameter of FIG. 22 overlaid on the map of the state of Ohio of FIG. 7.

Figure 25:
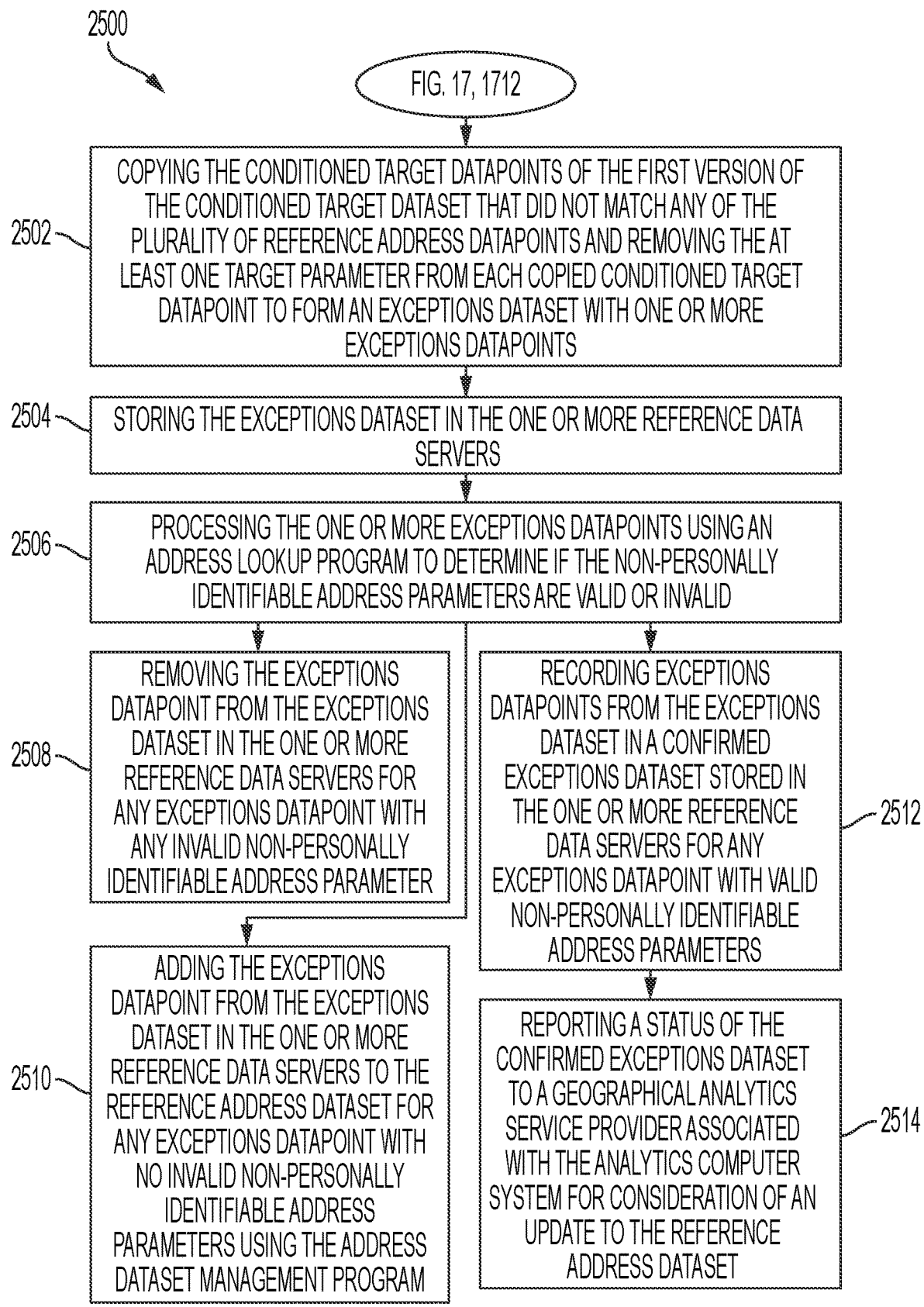
FIG. 25, in combination with FIG. 17, is a flow chart of another exemplary embodiment of a process for generating a geographical distribution of a target parameter of a target dataset.

With reference to FIGS. 17 and 25, still yet another exemplary embodiment of a process 2500 for generating a geographical distribution of a target parameter of a target dataset includes the process 1700 of FIG. 17 and continues from 1712 to 2502 where the conditioned target datapoints of the first version of the conditioned target dataset that did not match any of the plurality of reference address datapoints are copied and the at least one target parameter from each copied conditioned target datapoint is removed to form an exceptions dataset with one or more exceptions datapoints. Each exceptions datapoint includes the non-personally identifiable address parameters of the corresponding conditioned target datapoint with which the exceptions datapoint is associated. At 2504, the exceptions dataset is stored in the one or more reference data servers. At 2506, the one or more exceptions datapoints are processed using an address lookup program to determine if the non-personally identifiable address parameters are valid or invalid.

In other embodiments, the process 2500 may continue from 2506 to 2508, 2510, or 2512 in any combination and in any order. If the process 2500 continues to 2508, the exceptions datapoint is removed from the exceptions dataset in the one or more reference data servers for any exceptions datapoint with any invalid non-personally identifiable address parameter using an address dataset management program. If the process 2500 continues to 2510, the exceptions datapoint from the exceptions dataset in the one or more reference data servers is added to the reference address dataset for any exceptions datapoint with no invalid non-personally identifiable address parameters using the address dataset management program. If the process 2500 continues to 2512, exceptions datapoints from the exceptions dataset are recorded in a confirmed exceptions dataset stored in the one or more reference data servers using an address dataset management program for any exceptions datapoint with valid non-personally identifiable address parameters. In this embodiment, the confirmed exceptions dataset is stored in the one or more reference data servers. At 2514, a status of the confirmed exceptions dataset is reported to a geographical analytics service provider associated with the analytics computer system for consideration of an update to the reference address dataset.

Figure 26:
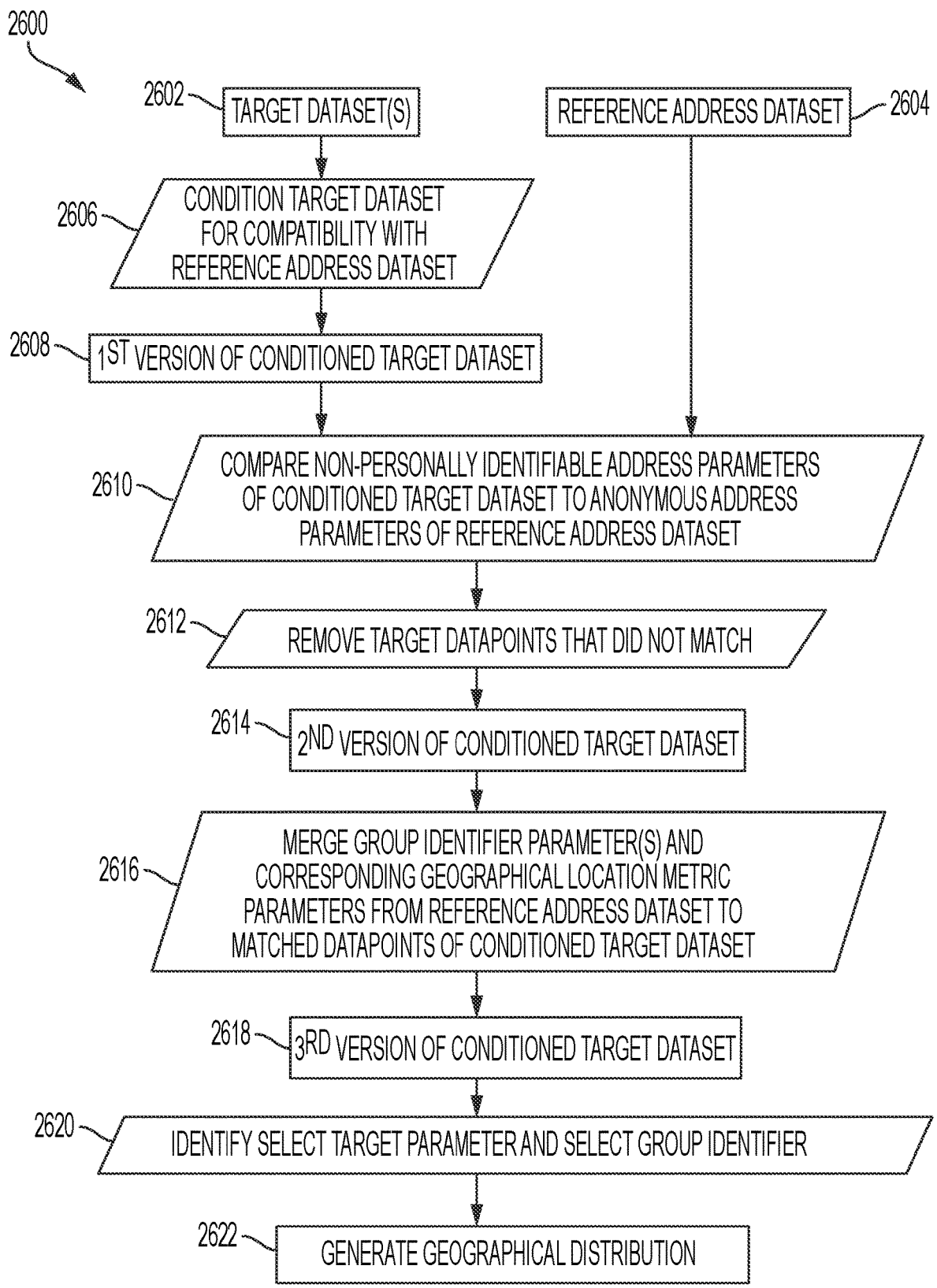
FIG. 26 is a functional diagram of yet another exemplary embodiment of a process for generating a geographical distribution of a target parameter of a target dataset.

With reference to FIG. 26, an exemplary embodiment of a process 2600 for generating a geographical distribution of a target parameter of a target dataset begins at 2602 where one or more target datasets for a select geographical area are accessed from at least one target data server by an analytics computer system via a data communication network. At 2604, a reference address dataset is accessed by the analytics computer system from one or more reference data servers. At 2606, the target dataset is conditioned for compatibility with the reference address dataset. This forms a first version of a conditioned target dataset (2608). At 2610, non-personally identifiable address parameters of the first version of the conditioned target dataset are compared to anonymous address parameters of the reference address dataset. At 2612, conditioned target datapoints that did not match any reference address datapoint are removed from the first version of the conditioned target dataset. This forms a second version of the conditioned target dataset (2614). At 2616, one or more group identifier parameter and corresponding geographical location metric parameters from the reference dataset are merged with matched target datapoints of the second version of the conditioned target dataset. This forms a third version of the conditioned target dataset (2618). At 2620, a select target parameter and a select group identifier parameter are identified from the merged target datapoints of the third version of the conditioned target dataset. At 2622, the merged target datapoints are processed based on the select target parameter and the select group identifier parameter to generate a geographical distribution of the select target parameter for the select geographical area.

Figure 27:
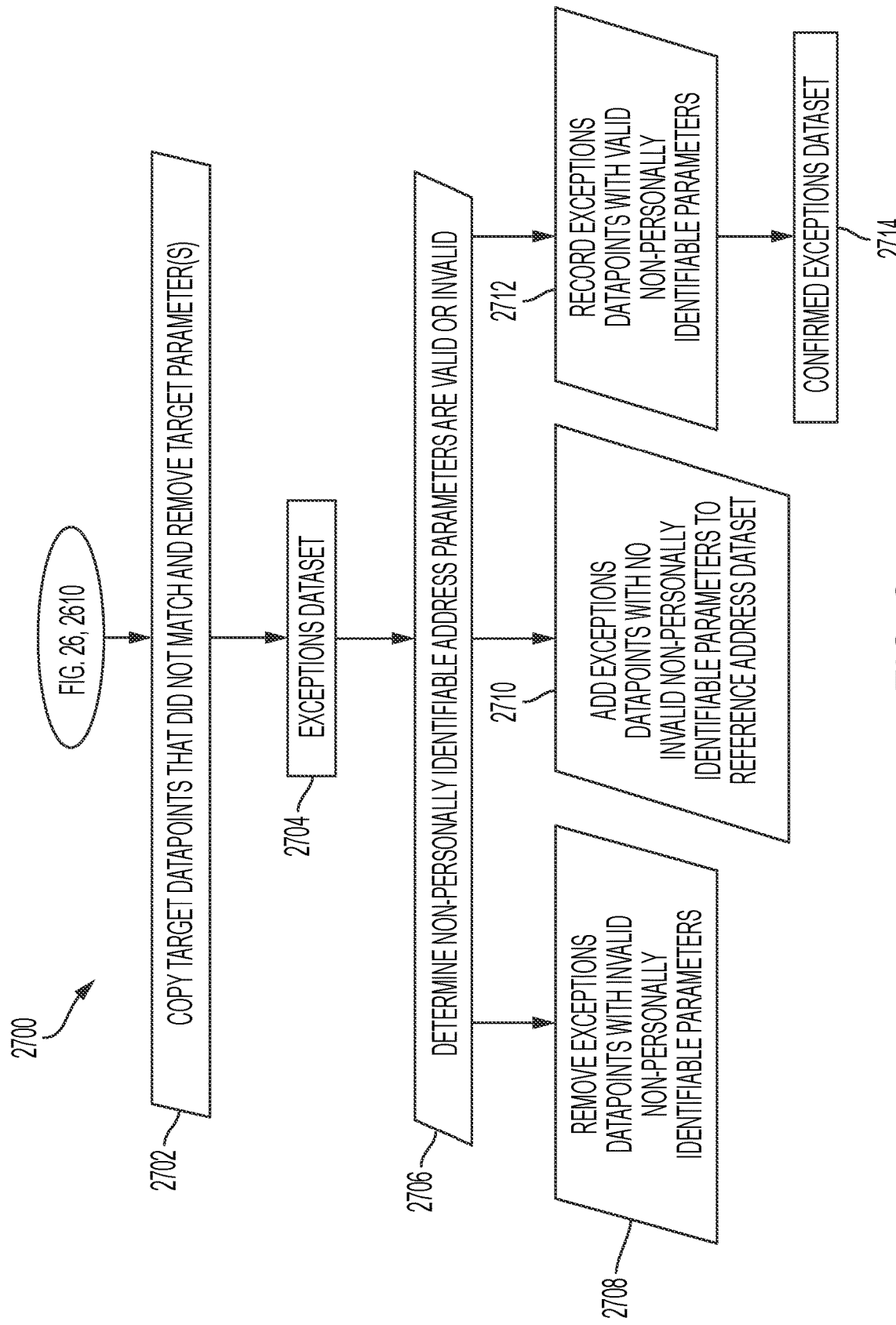
FIG. 27, in combination with FIG. 26, is a function diagram of still another exemplary embodiment of a process for generating a geographical distribution of a target parameter of a target dataset.

With reference to FIGS. 26 and 27, another exemplary embodiment of a process 2700 for generating a reduced address dataset for a geographical area includes the process 2600 of FIG. 26 and continues from 2610 to 2702 where the conditioned target datapoints of the first version of the conditioned target dataset that did not match any reference address datapoints are copied and target parameters are removed from each copied conditioned target datapoint. This forms an exceptions dataset (2704). At 2706, exceptions datapoints of the exceptions dataset are processed to determine if non-personally identifiable address parameters of the exceptions datapoints are valid or invalid.

In other embodiments, the process 2700 may continue from 2706 to 2708, 2710, or 2712 in any combination and in any order. If the process 2700 continues to 2708, the exceptions datapoint is removed from the exceptions dataset for any exceptions datapoint with any invalid non-personally identifiable address parameter. If the process 2700 continues to 2710, the exceptions datapoint from the exceptions dataset is added to the reference address dataset for any exceptions datapoint with no invalid non-personally identifiable address parameters. If the process 2700 continues to 2712, exceptions datapoints from the exceptions dataset are recorded and stored for any exceptions datapoint with valid non-personally identifiable address parameters. This forms a confirmed exceptions dataset (2714).

Figure 28:
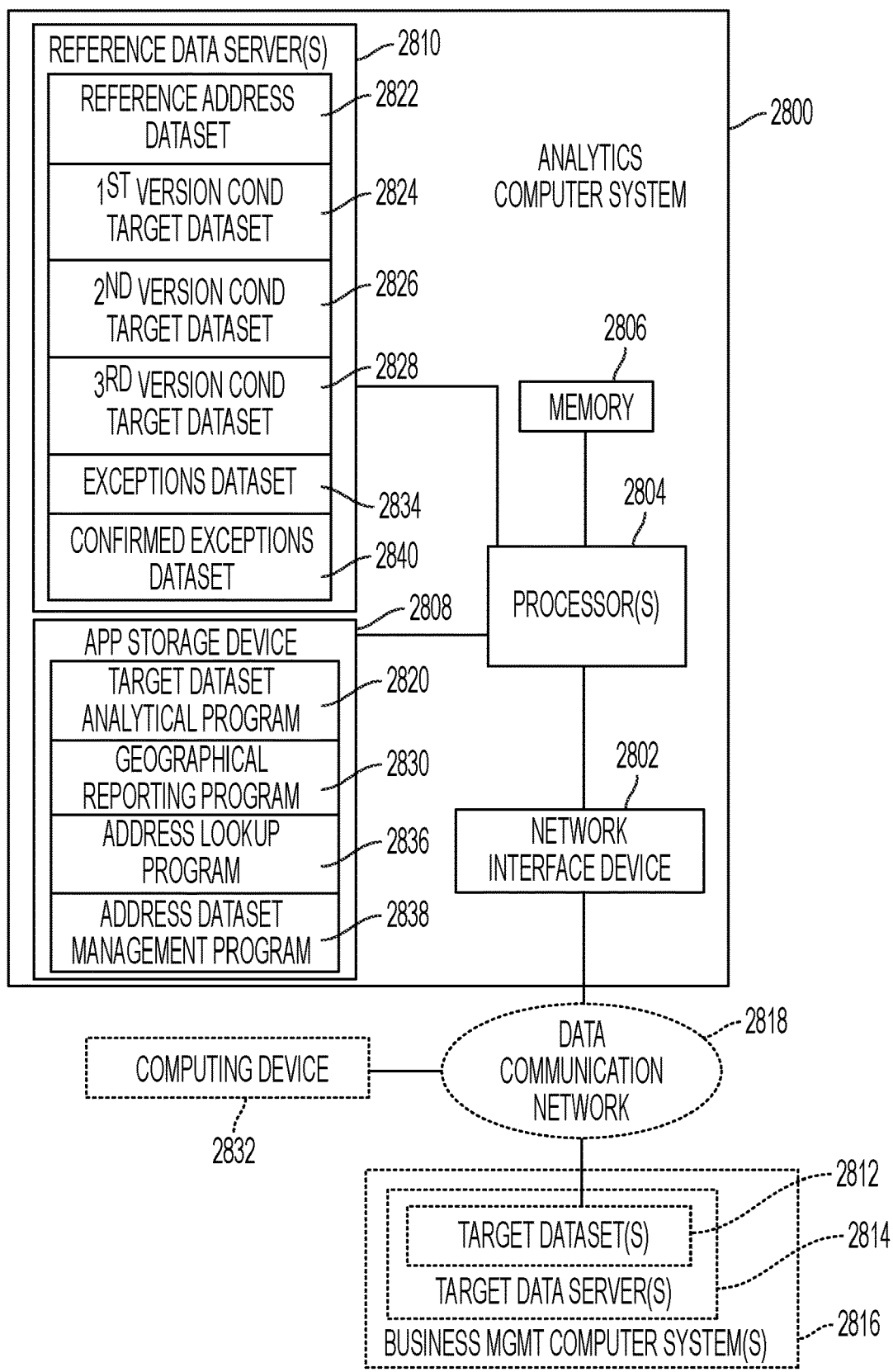
FIG. 28 is a block diagram of an exemplary embodiment of an analytics computer system for generating a geographical distribution of a target parameter of a target dataset.

With reference to FIG. 28, an exemplary embodiment of an analytics computer system 2800 for generating a geographical distribution of a target parameter of a target dataset includes at least one network interface device 2802, at least one processor 2804 and associated memory 2806, at least one application storage device 2808, and one or more reference data servers 2810. The at least one network interface device 2802 is configured to access a target dataset 2812 for a select geographical area stored in at least one target data server 2814 using the analytics computer system 2800 via a data communication network 2818. The target data server(s) 2814 may be associated with one or more business management computer systems 2816. The target dataset 2812 includes a plurality of target datapoints. Each target datapoint is represented by at least one target parameter and corresponding reported address parameters. The reported address parameters include personally identifiable address parameters and non-personally identifiable address parameters. The at least one application storage device 2808 is configured to store a target dataset analytical program 2820. The at least one processor 2804 and associated memory 2806, in conjunction with execution of the target dataset analytical program 2820, are configured to access a reference address dataset 2822 stored in the one or more reference data servers 2810. The reference address dataset 2822 includes a plurality of reference address datapoints, Each reference address datapoint is represented by anonymous address parameters, at least one group identifier parameter, and geographical location metric parameters associated with each group identifier parameter. Each group identifier parameter is associated with a different division of the plurality of reference address datapoints into a plurality of groups by matching values of a select combination of one or more anonymous address parameters from the plurality of anonymous address parameters. The at least one processor 2804 and associated memory 2806, in conjunction with execution of the target dataset analytical program 2820, are configured to condition the target dataset 2812 for compatibility with the reference address dataset 2822 and for compliance with requirements associated with generating geographical distributions of target parameters of the target dataset 2812. The conditioning is performed to form a first version 2824 of a conditioned target dataset with a plurality of conditioned target datapoints, Each conditioned target datapoint is represented by at least the at least one target parameter and the non-personally identifiable address parameters. The at least one processor 2804 and associated memory 2806, in conjunction with execution of the target dataset analytical program 2820, are configured to compare the non-personally identifiable address parameters of each conditioned target datapoint of the first version 2824 of the conditioned target dataset to the anonymous address parameters of the reference address datapoints of the reference address dataset 2822 to determine at least one reference address datapoint with the most matches of non-personally identifiable address parameters to anonymous address parameters for the corresponding conditioned target datapoint or to determine the corresponding conditioned target datapoint does not match any of the plurality of reference address datapoints. The analytics computer system 2800 and the conditioned target dataset (e.g., 2824) are for use by a geographical analytics service provider in analyzing the at least one target parameter which is associated with one or more managed service providers to develop geographical distributions of the at least one target parameter.

In another embodiment of the analytics computer system 2800, the target dataset 2812 includes a plurality of target datasets 2812 associated with a corresponding plurality of managed service providers. In yet another embodiment, the analytics computer system 2800 and the one or more reference data servers 2810 are cloud-based. In still another embodiment of the analytics computer system 2800, the at least one target data server 2814 and the one or more reference data servers 2810 are co-located. In still yet another embodiment of the analytics computer system 2800, the at least one target data server 2814 is hosted remotely in relation to the analytics computer system 2800 and the one or more reference data servers 2810. In another embodiment, the analytics computer system 2800 and the first version 2824 of the conditioned target dataset are for use by the geographical analytics service provider in analyzing the at least one target parameter to develop the geographical distributions.

In yet another embodiment of the analytics computer system 2800, the at least one processor 2802 and associated memory 2804, in conjunction with execution of the target dataset analytical program 2820, are configured to condition the target dataset 2812 by removing the personally identifiable address parameters from the reported address parameters of the plurality of target datapoints to form a second version 2826 of the conditioned target dataset with a plurality of anonymous target datapoints that exclude personally identifiable information. Each anonymous target datapoint is represented by the at least one target parameter and the non-personally identifiable address parameters.

In still another embodiment of the analytics computer system 2800, the at least one processor 2804 and associated memory 2806, in conjunction with execution of the target dataset analytical program 2820, are configured to condition the target dataset 2812 by adjusting the non-personally identifiable address parameters of the target dataset 2812 to align with corresponding anonymous address parameters of the reference address dataset 2822, In this embodiment, the at least one processor 2804 and associated memory 2806, in conjunction with execution of the target dataset analytical program 2820, are configured to condition the target dataset 2812 by linking the non-personally identifiable address parameters of the target dataset 2812 to the corresponding anonymous address parameters of the reference address dataset 2822.

In still yet another embodiment of the analytics computer system 2800, the at least one processor 2804 and associated memory 2806, in conjunction with execution of the target dataset analytical program 2820, are configured to condition the target dataset 2812 by linking non-personally identifiable address parameters of the target dataset 2812 to the corresponding anonymous address parameters of the reference address dataset 2822.

In another embodiment of the analytics computer system 2800, the at least one processor 2804 and associated memory 2806, in conjunction with execution of the target dataset analytical program 2820, are configured to condition the target dataset 2812 by comparing parameter values of a select non-personally identifiable address parameter from the plurality of non-personally identifiable address parameters for the plurality of conditioned target datapoints to a predetermined syntax for the select non-personally identifiable address parameter. In this embodiment, the at least one processor 2804 and associated memory 2806, in conjunction with execution of the target dataset analytical program 2820, are configured to condition the target dataset 2812 by clearing the parameter value for the select non-personally identifiable address parameter in each conditioned target datapoint in which the parameter value is not in compliance with the predetermined syntax. In a further embodiment of the analytics computer system 2800, the at least one processor 2804 and associated memory 2806, in conjunction with execution of the target dataset analytical program 2820, are configured to condition the target dataset 2812 by repeating the comparing and clearing for additional non-personally identifiable address parameters from the plurality of non-personally identifiable address parameters in the plurality of conditioned target datapoints. The comparing for additional non-personally identifiable address parameters is to predetermined syntaxes for the corresponding non-personally identifiable address parameters. In an even further embodiment of the analytics computer system 2800, the at least one processor 2804 and associated memory 2806, in conjunction with execution of the target dataset analytical program 2820, are configured to condition the target dataset 2812 by counting the amount of cleared parameter values for the plurality of non-personally identifiable address parameters for a select conditioned target datapoint of the plurality of conditioned target datapoints. In this embodiment, the at least one processor 2804 and associated memory 2806, in conjunction with execution of the target dataset analytical program 2820, are configured to condition the target dataset 2812 by removing the select conditioned target datapoint from the first version 2824 of the conditioned target dataset where the amount of cleared parameter values exceeds a predetermined threshold. The at least one processor 2804 and associated memory 2806, in conjunction with execution of the target dataset analytical program 2820, are configured to condition the target dataset 2812 by repeating the counting and removing for additional conditioned target datapoints of the plurality of conditioned target datapoints.

In yet another embodiment of the analytics computer system 2800, the at least one processor 2804 and associated memory 2806, in conjunction with execution of the target dataset analytical program 2820, are configured to store the first version 2824 of the conditioned target dataset in the one or more reference data servers.

In still another embodiment of the analytics computer system 2800, the at least one processor 2804 and associated memory 2806, in conjunction with execution of the target dataset analytical program 2820, are configured to remove the conditioned target datapoints that did not match any of the plurality of reference address datapoints from the plurality of conditioned target datapoints of the first version 2824 of the conditioned target dataset to form a second version 2826 of the conditioned target dataset with a plurality of matched target datapoints. Each matched target datapoint is represented by the at least one target parameter and the non-personally identifiable address parameters. In this embodiment, the at least one processor 2804 and associated memory 2806, in conjunction with execution of the target dataset analytical program 2820, are configured to merge the at least one group identifier parameter and the geographical location metric parameters associated with each group identifier parameter of the reference address datapoint with the corresponding matched target datapoint of the second version of the conditioned target dataset for conditioned target datapoints that were matched to reference address datapoints to form a third version 2828 of the conditioned target dataset with a plurality of merged target datapoints. Each merged target datapoint is represented by the at least one target parameter, the non-personally identifiable address parameters, the at least one group identifier parameter, and the geographical location metric parameters associated with each group identifier parameter. The at least one processor 2804 and associated memory 2806, in conjunction with execution of the target dataset analytical program 2820, are configured to identify a select target parameter from the at least one target parameter and a select group identifier from the at least one group identifier parameter of the merged target datapoints. The at least one application storage device 2820 is configured to store a geographical reporting program 2830. The at least one processor 2804 and associated memory 2806, in conjunction with execution of the geographical reporting program 2830, are configured to process the plurality of merged target datapoints of the third version 2828 of the conditioned target dataset based on the select target parameter and the select group identifier parameter to generate a geographical distribution of the select target parameter for the select geographical area based on values for the select group identifier parameter and the geographical location metric parameters associated with the select group identifier parameter.

In a further embodiment of the analytics computer system 2800, the at least one processor 2804 and associated memory 2806, in conjunction with execution of the target dataset analytical program 2820, are configured to store the second version 2826 of the conditioned target dataset in the one or more reference data servers 2810. In another further embodiment, the analytics computer system 2800 and the second version 2826 of the conditioned target dataset are for use by the geographical analytics service provider in analyzing the at least one target parameter to develop the geographical distributions. In yet another further embodiment of the analytics computer system 2800, the at least one processor 2804 and associated memory 2806, in conjunction with execution of the target dataset analytical program 2820, are configured to store the third version 2828 of the conditioned target dataset in the one or more reference data servers 2810. In still another further embodiment, the analytics computer system 2800 and the third version 2828 of the conditioned target dataset are for use by the geographical analytics service provider in analyzing the at least one target parameter to develop the geographical distributions.

In still yet another further embodiment, the analytics computer system 2800 also includes at least one geographical analytics server. In this embodiment, the at least one processor 2804 and associated memory 2806, in conjunction with execution of the geographical reporting program 2830, are configured to at least temporarily store an electronic representation of the geographical distribution of the select target parameter for the select geographical area in the at least one geographical analytics server. In another further embodiment of the analytics computer system 2800, the at least one processor 2804 and associated memory 2806, in conjunction with execution of the geographical reporting program 2830, are configured to send an electronic representation of the geographical distribution of the select target parameter for the select geographical area from the analytics computer system 2800 to a computing device 2832 associated with a subscriber of a geographical analytics service via the at least one network interface device 2802 and the data communication network 2818.

In still yet another embodiment of the analytics computer system 2800, the at least one processor 2804 and associated memory 2806, in conjunction with execution of the target dataset analytical program 2820, are configured to copy the conditioned target datapoints of the first version 2824 of the conditioned target dataset that did not match any of the plurality of reference address datapoints and remove the at least one target parameter from each copied conditioned target datapoint to form an exceptions dataset 2834 with one or more exceptions datapoints. Each exceptions datapoint includes the non-personally identifiable address parameters of the corresponding conditioned target datapoint with which the exceptions datapoint is associated. In this embodiment, the at least one processor 2804 and associated memory 2806, in conjunction with execution of the target dataset analytical program 2820, are configured to store the exceptions dataset 2834 in the one or more reference data servers 2810. The at least one application storage device 2808 is configured to store an address lookup program 2836. The at least one processor 2804 and associated memory 2806, in conjunction with execution of the address lookup program 2836, are configured to process the one or more exceptions datapoints to determine if the non-personally identifiable address parameters are valid or invalid.

In a further embodiment of the analytics computer system 2800, the at least one application storage device 2808 is configured to store an address dataset management program 2838. In this embodiment, the at least one processor 2804 and associated memory 2806, in conjunction with execution of the address dataset management program 2838, are configured to remove the exceptions datapoint from the exceptions dataset 2834 in the one or more reference data servers 2810 for any exceptions datapoint with any invalid non-personally identifiable address parameter.

In another further embodiment of the analytics computer system 2800, the at least one application storage device 2808 is configured to store an address dataset management program 2838, In this embodiment, the at least one processor 2804 and associated memory 2806, in conjunction with execution of the address dataset management program 2838, are configured to add the exceptions datapoint from the exceptions dataset 2834 in the one or more reference data servers 2810 to the reference address dataset 2822 for any exceptions datapoint with no invalid non-personally identifiable address parameters.

In yet another further embodiment of the analytics computer system 2800, the at least one application storage device 2808 is configured to store an address dataset management program 2838. In this embodiment, the at least one processor 2804 and associated memory 2806, in conjunction with execution of the address dataset management program 2838, are configured to record exceptions datapoints from the exceptions dataset in a confirmed exceptions dataset 2840 stored in the one or more reference data servers 2810 for any exceptions datapoint with valid non-personally identifiable address parameters. In this embodiment, the at least one processor 2804 and associated memory 2806, in conjunction with execution of the address dataset management program 2838, are configured store the confirmed exceptions dataset 2840 in the one or more reference data servers 2810. The at least one processor 2804 and associated memory 2806, in conjunction with execution of the address dataset management program 2838, are configured to report a status of the confirmed exceptions dataset 2840 to a geographical analytics service provider associated with the analytics computer system 2800 for consideration of an update to the reference address dataset 2822.

Some portions of the detailed description herein are presented in terms of algorithms and symbolic representations of operations on data bits performed by conventional computer components, including a central processing unit (CPU) (e.g., processor), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiments are not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiments have been described with reference to the preferred embodiments, Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A method of generating a reduced address dataset for a geographical area, comprising:

receiving a source address dataset for a select geographical area at one or more reduced data servers of an analytics computer system from at least one source data server of a source computer system via a data communication network, wherein the source address dataset includes a plurality of source address datapoints, wherein each source address datapoint is represented by detailed address parameters and corresponding geographical location parameters, wherein the detailed address parameters include personally identifiable address parameters and anonymous address parameters;

removing the personally identifiable address parameters from the detailed address parameters of the plurality of source address datapoints at the analytics computer system to form a first version of a reduced address dataset with a plurality of anonymous address datapoints, wherein each anonymous address datapoint is represented by the anonymous address parameters and the geographical location parameters; and storing the first version of the reduced address dataset in the one or more reduced data servers;

wherein the reduced address dataset is for use by a geographical analytics service provider as a reference address dataset in analyzing target parameters in a target dataset associated with one or more managed service providers to develop geographical distributions of the target parameters.

2. The method of claim 1, further comprising:

comparing parameter values of a select anonymous address parameter from the plurality of anonymous address parameters for the plurality of anonymous address datapoints to a predetermined syntax for the select anonymous address parameter;

clearing the parameter value for the select anonymous address parameter in each anonymous address datapoint in which the parameter value is not in compliance with the predetermined syntax;

repeating the comparing and clearing for additional anonymous address parameters from the plurality of anonymous address parameters in the plurality of anonymous address datapoints, wherein the comparing for additional anonymous address parameters is to predetermined syntaxes for the corresponding anonymous address parameters;

counting the amount of cleared parameter values for the plurality of anonymous address parameters for a select anonymous address datapoint of the plurality of anonymous address datapoints;

removing the select anonymous address datapoint from the first version of the reduced address dataset where the amount of cleared parameter values exceeds a predetermined threshold; and repeating the counting and removing for additional anonymous address datapoints of the plurality of anonymous address datapoints.

3. The method of claim 1, further comprising:

identifying a first select combination of one or more anonymous address parameters from the plurality of anonymous address parameters;

dividing the plurality of anonymous address datapoints of the first version of the reduced address dataset into a first plurality of groups by matching values for the one or more anonymous address parameters associated with the first select combination;

adding a first group identifier parameter to the plurality of anonymous address datapoints of the first version of the reduced address dataset to form a second version of the reduced address dataset, wherein each anonymous address datapoint of the second version of the reduced address dataset is represented by the anonymous address parameters, the first group identifier parameter, and the geographical location parameters;

assigning a group identifier to each of the first plurality of groups and setting a value for the first group identifier parameter in each of the plurality of anonymous address datapoints to the group identifier with which the corresponding anonymous address datapoint is associated; and storing the second version of the reduced address dataset n the one or more reduced data servers.

4. The method of claim 3, further comprising:

identifying a second select combination of one or more anonymous address parameters from the plurality of anonymous address parameters, wherein the second select combination is different from the first select combination;

dividing the plurality of anonymous address datapoints of the second version of the reduced address dataset into a second plurality of groups by matching values for the one or more anonymous address parameters associated with the second select combination;

adding a second group identifier parameter to the plurality of anonymous address datapoints of the second version of the reduced address dataset to form a third version of the reduced address dataset, wherein each anonymous address datapoint of the third version of the reduced address dataset is represented by the anonymous address parameters, the first group identifier parameter, the second group identifier parameter, and the geographical location parameters;

assigning a second group identifier to each of the second plurality of groups and setting a value for the second group identifier parameter in each of the plurality of anonymous address datapoints to the second group identifier with which the corresponding anonymous address datapoint is associated;

storing the third version of the reduced address dataset in the one or more reduced data servers; and removing the first group identifier parameter from the third version of the reduced address dataset, wherein each anonymous address datapoint of the third version of the reduced address dataset is represented by the anonymous address parameters, the second group identifier parameter, and the geographical location parameters.

5. The method of claim 3, further comprising:

processing each group of anonymous address datapoints based on the geographical location parameters of the anonymous address datapoints associated with the corresponding group to generate geographical location metrics for each group of the first plurality of groups;

adding geographical location metric parameters to the plurality of anonymous address datapoints of the second version of the reduced address dataset to form a third version of the reduced address dataset, wherein the geographical location metric parameters correspond to the generated geographical location metrics, wherein each anonymous address datapoint of the third version of the reduced address dataset is represented by the anonymous address parameters, the first group identifier parameter, the geographical location parameters, and the geographical location metric parameters;

setting values for the geographical location metric parameters in each of the plurality of anonymous address datapoints to the corresponding geographical location metrics generated for the corresponding anonymous address datapoint; and storing the third version of the reduced address dataset in the one or more reduced data servers.

6. The method of claim 5, wherein the geographical location metrics for each group include any combination of a maximum longitude, a minimum longitude, an average longitude, a median longitude, a longitude mode, and a longitude standard deviation, the method further comprising:

trimming at least one of the maximum longitude and the minimum longitude for at least one group of anonymous address datapoints based on the corresponding maximum longitude or minimum longitude exceeding a predetermined threshold in relation to a central tendency for longitude;

repeating the processing of the anonymous address datapoints associated with the corresponding group to re-generate the geographical location metrics for the corresponding group; and revising the values for the geographical location metric parameters for the anonymous address datapoints associated with the corresponding group to the corresponding re-generated geographical location metrics.

7. The method of claim 5, wherein the geographical location metrics for each group include any combination of a maximum latitude, a minimum latitude, an average latitude, a median latitude, a latitude mode, and a latitude standard deviation, the method further comprising:

trimming at least one of the maximum latitude and the minimum latitude for at least one group of anonymous address datapoints based on the corresponding maximum latitude or minimum latitude exceeding a predetermined threshold in relation to a central tendency for latitude;

repeating the processing of the anonymous address datapoints associated with the corresponding group to re-generate the geographical location metrics for the corresponding group; and revising the values for the geographical location metric parameters for the anonymous address datapoints associated with the corresponding group to the corresponding re-generated geographical location metrics.

8. The method of claim 5, wherein the geographical location metrics for each group include any combination of a maximum elevation, a minimum elevation, an average elevation, a median elevation, an elevation mode, and an elevation standard deviation, the method further comprising:
  trimming at least one of the maximum elevation and the minimum elevation for at least one group of anonymous address datapoints based on the corresponding maximum elevation or minimum elevation exceeding a predetermined threshold in relation to a central tendency for elevation;
  repeating the processing of the anonymous address datapoints associated with the corresponding group to re-generate the geographical location metrics for the corresponding group; and
  revising the values for the geographical location metric parameters for the anonymous address datapoints associated with the corresponding group to the corresponding re-generated geographical location metrics.

9. The method of claim 5, further comprising:
  removing the geographical location parameters from the plurality of anonymous address datapoints of the third version of the reduced address dataset to form a fourth version of the reduced address dataset, wherein each anonymous address datapoint of the fourth version of the reduced address dataset is represented by the anonymous address parameters, the first group identifier parameter, and the geographical location metric parameters;
  storing the fourth version of the reduced address dataset in the one or more reduced data servers;
  removing duplicate anonymous address datapoints from the plurality of anonymous address datapoints of the fourth version of the reduced address dataset to form a fifth version of the reduced address dataset with a plurality of anonymous address datapoints, wherein the duplicate anonymous address datapoints have the same values for the anonymous address parameters, the first group identifier parameter, and the geographical location metric parameters, wherein each anonymous address datapoint of the fifth version of the reduced address dataset is represented by the anonymous address parameters, the first group identifier parameter, and the geographical location metric parameters; and
  storing the fifth version of the reduced address dataset in the one or more reduced data servers.

10. A method of generating a geographical distribution of a target parameter of a target dataset, comprising:
  accessing a target dataset for a select geographical area stored in at least one target data server using an analytics computer system via a data communication network, wherein the target dataset includes a plurality of target datapoints, wherein each target datapoint is represented by at least one target parameter and corresponding reported address parameters, wherein the reported address parameters include personally identifiable address parameters and non-personally identifiable address parameters;
  accessing a reference address dataset stored in one or more reference data servers using the analytics computer system, wherein the reference address dataset includes a plurality of reference address datapoints, wherein each reference address datapoint is represented by anonymous address parameters, at least one group identifier parameter, and geographical location metric parameters associated with each group identifier parameter, wherein each group identifier parameter is associated with a different division of the plurality of reference address datapoints into a plurality of groups by matching values of a select combination of one or more anonymous address parameters from the plurality of anonymous address parameters;
  conditioning the target dataset for compatibility with the reference address dataset and for compliance with requirements associated with generating geographical distributions of target parameters of the target dataset, wherein the conditioning is performed at the analytics computer system to form a first version of a conditioned target dataset with a plurality of conditioned target datapoints, wherein each conditioned target datapoint is represented by at least the at least one target parameter and the non-personally identifiable address parameters; and
  comparing the non-personally identifiable address parameters of each conditioned target datapoint of the first version of the conditioned target dataset to the anonymous address parameters of the reference address datapoints of the reference address dataset at the analytics computer system to determine at least one reference address datapoint with the most matches of non-personally identifiable address parameters to anonymous address parameters for the corresponding conditioned target datapoint or to determine the corresponding conditioned target datapoint does not match any of the plurality of reference address datapoints;
  wherein the conditioned target dataset is for use by a geographical analytics service provider in analyzing the at least one target parameter which is associated with one or more managed service providers to develop geographical distributions of the at least one target parameter.

11. The method of claim 10, the conditioning of the target dataset comprising:
  removing the personally identifiable address parameters from the reported address parameters of the plurality of target datapoints at the analytics computer system to form the first version of the conditioned target dataset with a plurality of anonymous target datapoints that exclude personally identifiable information, wherein each anonymous target datapoint is represented by the at least one target parameter and the non-personally identifiable address parameters.

12. The method of claim 10, the conditioning of the target dataset comprising:
  adjusting the non-personally identifiable address parameters of the target dataset to align with corresponding anonymous address parameters of the reference address dataset; and
  linking the non-personally identifiable address parameters of the target dataset to the corresponding anonymous address parameters of the reference address dataset.

13. The method of claim 10, the conditioning of the target dataset comprising:
  linking the non-personally identifiable address parameters of the target dataset to corresponding anonymous address parameters of the reference address dataset.

14. The method of claim 10, the conditioning of the target dataset comprising:
  comparing parameter values of a select non-personally identifiable address parameter from the plurality of non-personally identifiable address parameters for the plurality of conditioned target datapoints to a predetermined syntax for the select non-personally identifiable address parameter;
  clearing the parameter value for the select non-personally identifiable address parameter in each conditioned target datapoint in which the parameter value is not in compliance with the predetermined syntax;

repeating the comparing and clearing for additional non-personally identifiable address parameters from the plurality of non-personally identifiable address parameters in the plurality of conditioned target datapoints, wherein the comparing for additional non-personally identifiable address parameters is to predetermined syntaxes for the corresponding non-personally identifiable address parameters;

counting the amount of cleared parameter values for the plurality of non-personally identifiable address parameters for a select conditioned target datapoint of the plurality of conditioned target datapoints;

removing the select conditioned target datapoint from the first version of the conditioned target dataset where the amount of cleared parameter values exceeds a predetermined threshold; and repeating the counting and removing for additional conditioned target datapoints of the plurality of conditioned target datapoints.

15. The method of claim 10, further comprising:

removing the conditioned target datapoints that did not match any of the plurality of reference address datapoints from the plurality of conditioned target datapoints of the first version of the conditioned target dataset to form a second version of the conditioned target dataset with a plurality of matched target datapoints, wherein each matched target datapoint is represented by the at least one target parameter and the non-personally identifiable address parameters;

merging the at least one group identifier parameter and the geographical location metric parameters associated with each group identifier parameter of the reference address datapoint with the corresponding matched target datapoint of the second version of the conditioned target dataset for conditioned target datapoints that were matched to reference address datapoints to form a third version of the conditioned target dataset with a plurality of merged target datapoints, wherein each merged target datapoint is represented by the at least one target parameter, the non-personally identifiable address parameters, the at least one group identifier parameter, and the geographical location metric parameters associated with each group identifier parameter;

identifying a select target parameter from the at least one target parameter and a select group identifier from the at least one group identifier parameter of the merged target datapoints; and processing the plurality of merged target datapoints of the third version of the conditioned target dataset based on the select target parameter and the select group identifier parameter to generate a geographical distribution of the select target parameter for the select geographical area based on values for the select group identifier parameter and the geographical location metric parameters associated with the select group identifier parameter.

16. The method of claim 10, further comprising:

copying the conditioned target datapoints of the first version of the conditioned target dataset that did not match any of the plurality of reference address datapoints and removing the at least one target parameter from each copied conditioned target datapoint to form an exceptions dataset with one or more exceptions datapoints, wherein each exceptions datapoint includes the non-personally identifiable address parameters of the corresponding conditioned target datapoint with which the exceptions datapoint is associated;

storing the exceptions dataset in the one or more reference data servers; and processing the one or more exceptions datapoints using an address lookup program to determine if the non-personally identifiable address parameters are valid or invalid.

17. The method of claim 16, further comprising:

removing the exceptions datapoint from the exceptions dataset in the one or more reference data servers for any exceptions datapoint with any invalid non-personally identifiable address parameter using an address dataset management program.

18. The method of claim 16, further comprising:

adding the exceptions datapoint from the exceptions dataset in the one or more reference data servers to the reference address dataset for any exceptions datapoint with no invalid non-personally identifiable address parameters using the address dataset management program.

19. The method of claim 16, further comprising:

recording exceptions datapoints from the exceptions dataset in a confirmed exceptions dataset stored in the one or more reference data servers using an address dataset management program for any exceptions datapoint with valid non-personally identifiable address parameters;

storing the confirmed exceptions dataset in the one or more reference data servers; and reporting a status of the confirmed exceptions dataset to a geographical analytics service provider associated with the analytics computer system for consideration of an update to the reference address dataset.

20. An analytics computer system for generating a geographical distribution of a target parameter of a target dataset, comprising:

at least one network interface device configured to access a target dataset for a select geographical area stored in at least one target data server using an analytics computer system via a data communication network, wherein the target dataset includes a plurality of target datapoints, wherein each target datapoint is represented by at least one target parameter and corresponding reported address parameters, wherein the reported address parameters include personally identifiable address parameters and non-personally identifiable address parameters;

at least one processor and associated memory;

at least one application storage device configured to store a target dataset analytical program; and one or more reference data servers;

wherein the at least one processor and associated memory, in conjunction with execution of the target dataset analytical program, are configured to access a reference address dataset stored in the one or more reference data servers, wherein the reference address dataset includes a plurality of reference address datapoints, wherein each reference address datapoint is represented by anonymous address parameters, at least one group identifier parameter, and geographical location metric parameters associated with each group identifier parameter, wherein each group identifier parameter is associated with a different division of the plurality of reference address datapoints into a plurality of groups by matching values of a select combination of one or more anonymous address parameters from the plurality of anonymous address parameters;

wherein the at least one processor and associated memory, in conjunction with execution of the target dataset analytical program, are configured to condition the target dataset for compatibility with the reference address dataset and for compliance with requirements associated with generating geographical distributions of target parameters of the target dataset, wherein the conditioning is performed to form a first version of a conditioned target dataset with a plurality of conditioned target datapoints, wherein each conditioned target datapoint is represented by at least the at least one target parameter and the non-personally identifiable address parameters;

wherein the at least one processor and associated memory, in conjunction with execution of the target dataset analytical program, are configured to compare the non-personally identifiable address parameters of each conditioned target datapoint of the first version of the conditioned target dataset to the anonymous address parameters of the reference address datapoints of the reference address dataset to determine at least one reference address datapoint with the most matches of non-personally identifiable address parameters to anonymous address parameters for the corresponding conditioned target datapoint or to determine the corresponding conditioned target datapoint does not match any of the plurality of reference address datapoints;

wherein the analytics computer system and the conditioned target dataset are for use by a geographical analytics service provider in analyzing the at least one target parameter which is associated with one or more managed service providers to develop geographical distributions of the at least one target parameter.

21. The analytics computer system of claim 20, wherein the at least one processor and associated memory, in conjunction with execution of the target dataset analytical program, are configured to remove the conditioned target datapoints that did not match any of the plurality of reference address datapoints from the plurality of conditioned target datapoints of the first version of the conditioned target dataset to form a second version of the conditioned target dataset with a plurality of matched target datapoints, wherein each matched target datapoint is represented by the at least one target parameter and the non-personally identifiable address parameters;

wherein the at least one processor and associated memory, in conjunction with execution of the target dataset analytical program, are configured to merge the at least one group identifier parameter and the geographical location metric parameters associated with each group identifier parameter of the reference address datapoint with the corresponding matched target datapoint of the second version of the conditioned target dataset for conditioned target datapoints that were matched to reference address datapoints to form a third version of the conditioned target dataset with a plurality of merged target datapoints, wherein each merged target datapoint is represented by the at least one target parameter, the non-personally identifiable address parameters, the at least one group identifier parameter, and the geographical location metric parameters associated with each group identifier parameter;

wherein the at least one processor and associated memory, in conjunction with execution of the target dataset analytical program, are configured to identify a select target parameter from the at least one target parameter and a select group identifier from the at least one group identifier parameter of the merged target datapoints;

wherein the at least one application storage device is configured to store a geographical reporting program, wherein the at least one processor and associated memory, in conjunction with execution of the geographical reporting program, are configured to process the plurality of merged target datapoints of the third version of the conditioned target dataset based on the select target parameter and the select group identifier parameter to generate a geographical distribution of the select target parameter for the select geographical area based on values for the select group identifier parameter and the geographical location metric parameters associated with the select group identifier parameter.

22. The analytics computer system of claim 20, wherein the at least one processor and associated memory, in conjunction with execution of the target dataset analytical program, are configured to copy the conditioned target datapoints of the first version of the conditioned target dataset that did not match any of the plurality of reference address datapoints and remove the at least one target parameter from each copied conditioned target datapoint to form an exceptions dataset with one or more exceptions datapoints, wherein each exceptions datapoint includes the non-personally identifiable address parameters of the corresponding conditioned target datapoint with which the exceptions datapoint is associated;

wherein the at least one processor and associated memory, in conjunction with execution of the target dataset analytical program, are configured to store the exceptions dataset in the one or more reference data servers;

wherein the at least one application storage device is configured to store an address lookup program, wherein the at least one processor and associated memory, in conjunction with execution of the address lookup program, are configured to process the one or more exceptions datapoints to determine if the non-personally identifiable address parameters are valid or invalid.

\* \* \* \* \*